US007839415B2

(12) United States Patent
Hilliard et al.

(10) Patent No.: US 7,839,415 B2
(45) Date of Patent: *Nov. 23, 2010

(54) METHOD AND SYSTEM FOR IMPROVED INTERNET COLOR

(75) Inventors: William Hilliard, San Francisco, CA (US); Kees van Prooijen, Mill Valley, CA (US); Peter G. Engeldrum, Winchester, MA (US); Jean-Pierre Huber, Neydens (FR); Thomas Strother, San Francisco, CA (US); Peter Bernard, San Francisco, CA (US); Joel Warwick, Mill Valley, CA (US); Keith Ball, San Jose, CA (US); James Deutch, San Jose, CA (US); Tamara Baker, San Jose, CA (US)

(73) Assignee: VeriSign, Inc., Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/041,596

(22) Filed: Mar. 3, 2008

(65) Prior Publication Data

US 2008/0208967 A1 Aug. 28, 2008

Related U.S. Application Data

(63) Continuation of application No. 09/803,219, filed on Mar. 7, 2001, now Pat. No. 7,339,595, which is a continuation-in-part of application No. 09/439,482, filed on Nov. 12, 1999, now Pat. No. 7,177,466, which is a continuation-in-part of application No. 09/422,215, filed on Oct. 19, 1999, now Pat. No. 6,693,647.

(60) Provisional application No. 60/108,444, filed on Nov. 13, 1998, provisional application No. 60/108,442, filed on Nov. 13, 1998, provisional application No. 60/108,229, filed on Nov. 13, 1998.

(51) Int. Cl.
G09G 5/02 (2006.01)
(52) U.S. Cl. ...................................... 345/589; 345/600
(58) Field of Classification Search ................. 345/589, 345/590, 591, 593–595, 600
See application file for complete search history.

(56) References Cited

U.S. PATENT DOCUMENTS 4,641,274 A 2/1987 Swank (Continued)

FOREIGN PATENT DOCUMENTS

EP 0849936 A2 6/1998

(Continued)

OTHER PUBLICATIONS

Fox, A. et al., "Reducing WWW Latency and Bandwidth Requirements by Real-Time Distillation," Computer Networks and ISDN Systems, vol. 28, No. 11, May 1, 1996, pp. 1445-1456.

(Continued)

*Primary Examiner*—Michelle K Lay
(74) *Attorney, Agent, or Firm*—Blakely, Sokoloff, Taylor & Zafman, LLP; Judith A. Szepesi

(57) ABSTRACT

The present invention provides a technique for providing color corrected images to a user over a network. In particular, the present invention allows multiple image providers to provide color corrected images to a user when the user's computer and its associated devices are not calibrated and/or characterized, or the calibration and/or characterization data is not available over the network to the image providers. This abstract is provided for the sole purpose of complying with the rules requiring an abstract to allow a searcher or other reader to quickly ascertain the subject matter of the technical disclosure contained herein. This abstract is submitted with the express understanding that it will not be used to interpret or to limit the scope or the meaning of the claims.

19 Claims, 15 Drawing Sheets

U.S. PATENT DOCUMENTS

| | | |
|---|---|---|
| 5,247,358 A | 9/1993 | Richards |
| 5,298,993 A | 3/1994 | Edgar et al. |
| 5,381,349 A | 1/1995 | Winter et al. |
| 5,483,259 A | 1/1996 | Sachs |
| 5,606,365 A | 2/1997 | Maurinus et al. |
| 5,619,349 A | 4/1997 | Ueda et al. |
| 5,638,117 A | 6/1997 | Engeldrum |
| 5,666,215 A | 9/1997 | Fredlund et al. |
| 5,739,809 A | 4/1998 | McLaughlin et al. |
| 5,774,230 A | 6/1998 | Goto |
| 5,793,414 A | 8/1998 | Shaffer |
| 5,806,081 A | 9/1998 | Swen et al. |
| 5,818,525 A | 10/1998 | Elabd |
| 5,850,484 A | 12/1998 | Beretta et al. |
| 5,874,988 A | 2/1999 | Gu |
| 5,910,796 A | 6/1999 | Gormish |
| 5,966,465 A | 10/1999 | Keith et al. |
| 5,990,901 A | 11/1999 | Lawton et al. |
| 5,999,664 A | 12/1999 | Mahoney et al. |
| 6,006,231 A | 12/1999 | Popa |
| 6,008,836 A | 12/1999 | Bruck et al. |
| 6,009,192 A | 12/1999 | Klassen et al. |
| 6,016,167 A | 1/2000 | Brett |
| 6,035,323 A | 3/2000 | Narayen et al. |
| 6,036,317 A | 3/2000 | Seegers et al. |
| 6,064,437 A | 5/2000 | Phan et al. |
| 6,070,167 A | 5/2000 | Qian et al. |
| 6,075,514 A | 6/2000 | Ryan |
| 6,075,888 A | 6/2000 | Schwartz |
| 6,081,254 A | 6/2000 | Tanaka et al. |
| 6,081,840 A | 6/2000 | Zhao |
| 6,088,475 A | 7/2000 | Nagashima et al. |
| 6,091,518 A | 7/2000 | Anabuki |
| 6,097,838 A | 8/2000 | Klassen et al. |
| 6,097,853 A | 8/2000 | Gu et al. |
| 6,105,063 A | 8/2000 | Hayes, Jr. |
| 6,105,066 A | 8/2000 | Hayes, Jr. |
| 6,106,167 A | 8/2000 | Gao et al. |
| 6,108,712 A | 8/2000 | Hayes, Jr. |
| 6,154,600 A | 11/2000 | Newman et al. |
| 6,157,735 A | 12/2000 | Holub |
| 6,166,781 A | 12/2000 | Kwak et al. |
| 6,167,382 A | 12/2000 | Sparks et al. |
| 6,182,073 B1 | 1/2001 | Kukkal |
| 6,185,619 B1 | 2/2001 | Joffe et al. |
| 6,198,552 B1 | 3/2001 | Nagae |
| 6,198,842 B1 | 3/2001 | Yeo |
| 6,223,209 B1 | 4/2001 | Watson |
| 6,243,420 B1 | 6/2001 | Mitchell et al. |
| 6,243,761 B1 | 6/2001 | Mogul et al. |
| 6,268,939 B1 | 7/2001 | Klassen et al. |
| 6,269,078 B1 | 7/2001 | Lakshman et al. |
| 6,289,371 B1 | 9/2001 | Kumpf et al. |
| 6,307,961 B1 | 10/2001 | Balonon-Rosen et al. |
| 6,309,117 B1 | 10/2001 | Bunce et al. |
| 6,335,966 B1 | 1/2002 | Toyoda |
| 6,337,922 B2 | 1/2002 | Kumada |
| 6,345,303 B1 | 2/2002 | Knauerhase et al. |
| 6,430,311 B1 | 8/2002 | Kumada |
| 6,439,722 B1 | 8/2002 | Seegers et al. |
| 6,442,598 B1 | 8/2002 | Wright et al. |
| 6,504,950 B1 | 1/2003 | Murashita et al. |
| 6,510,438 B2 | 1/2003 | Hasegawa |
| 6,525,721 B1 | 2/2003 | Thomas |
| 6,567,983 B1 | 5/2003 | Shiimori |
| 6,571,271 B1 | 5/2003 | Savitzky et al. |
| 6,581,109 B1 * | 6/2003 | Fields et al. ............... 709/246 |
| 6,693,647 B1 | 2/2004 | Bernard et al. |
| 6,744,448 B1 | 6/2004 | Bernard et al. |
| 6,751,673 B2 | 6/2004 | Shaw |
| 6,760,885 B1 | 7/2004 | Hyman et al. |
| 6,785,704 B1 | 8/2004 | McCanne |
| 6,895,113 B2 | 5/2005 | Baker et al. |
| 6,976,026 B1 | 12/2005 | Getzinger et al. |
| 6,976,028 B2 | 12/2005 | Fenton et al. |
| 7,016,869 B1 | 3/2006 | Haeberli |
| 7,107,607 B2 | 9/2006 | Miyagi et al. |
| 7,149,803 B2 | 12/2006 | Douglis et al. |
| 7,177,448 B1 | 2/2007 | Sah |
| 2001/0048436 A1 | 12/2001 | Sanger |
| 2002/0035579 A1 | 3/2002 | Wang et al. |
| 2002/0051223 A1 | 5/2002 | Izumi et al. |
| 2002/0056010 A1 | 5/2002 | Lincoln et al. |
| 2002/0067500 A1 | 6/2002 | Yokomizo et al. |
| 2002/0078233 A1 | 6/2002 | Biliris et al. |
| 2002/0083124 A1 | 6/2002 | Knox et al. |
| 2002/0091940 A1 | 7/2002 | Welborn et al. |
| 2002/0116444 A1 | 8/2002 | Chaudhri et al. |
| 2002/0181012 A1 | 12/2002 | Miller et al. |
| 2002/0194195 A1 | 12/2002 | Fenton et al. |
| 2003/0009528 A1 | 1/2003 | Sharif et al. |
| 2003/0028606 A1 | 2/2003 | Koopmans et al. |
| 2003/0058457 A1 | 3/2003 | Fredlund et al. |
| 2003/0079027 A1 | 4/2003 | Slocombe et al. |
| 2003/0091229 A1 | 5/2003 | Edge et al. |
| 2003/0110182 A1 | 6/2003 | Christophersen et al. |
| 2003/0115281 A1 | 6/2003 | McHenry et al. |
| 2003/0152034 A1 | 8/2003 | Zhang et al. |
| 2003/0182375 A1 | 9/2003 | Zhu et al. |
| 2006/0209701 A1 | 9/2006 | Zhang et al. |
| 2006/0242072 A1 | 10/2006 | Peled et al. |

FOREIGN PATENT DOCUMENTS

| | | |
|---|---|---|
| EP | 0 878 303 A2 | 11/1998 |
| EP | 0 889 636 A2 | 1/1999 |
| EP | 0 907 283 A1 | 4/1999 |
| EP | 1103918 A2 | 5/2001 |
| JP | 10-117290 | 5/1998 |
| JP | 10-224643 | 8/1998 |
| WO | WO 98/15091 | 4/1998 |
| WO | WO 98/37690 | 8/1998 |
| WO | WO 00/08889 | 2/2000 |
| WO | WO 00/23944 | 4/2000 |
| WO | WO 00/29935 A1 | 5/2000 |
| WO | WO 01/75802 | 10/2001 |
| WO | WO 02/073469 A2 | 9/2002 |

OTHER PUBLICATIONS

"Encrypted Username/Password Support," Netscape Internet Site—Consumer Articles, Aug. 12, 1998, 1 page.

"'Padlock' Security Indicator Does Not Work Correctly With Frames," Netscape Internet site—Consumer Articles, Aug. 12, 1998, 1 page.

Greenman, Catherine, "Circuits: getting colors right with new technology", The New York Times, Thursday, Feb. 10, 2000.

Acharya, S, et al. "Systematic multiresolution and its application to the world wide web" Data Engineering, Mar. 23, 1999, pp. 40-49, IEEE Comput Soc, US.

Fox, A. et al., "Adapting to network and client variability via on-demand dynamic distillation" Sep. 1, 1996, pp. 160-170 ( XP-000639230).

Bickmore, T W et al., "Digestor: device-independent access to the world wide web" Computer Networks and ISDN Systems, North Holland Publishing, Amsterdam, NL, vol. 29, No. 8-13, Sep. 1, 1997 pp. 1075-1082.

Pantone Personal Color Calibrator brochure, 1999.

Patent Abstracts of Japan, Pub. No. 10-224643, Aug. 21, 1998, Canon, Inc.

SGI Cosmo Color Web Color Management brochure, 1996, 2 pages.

WebSync brochure, 1999.

* cited by examiner

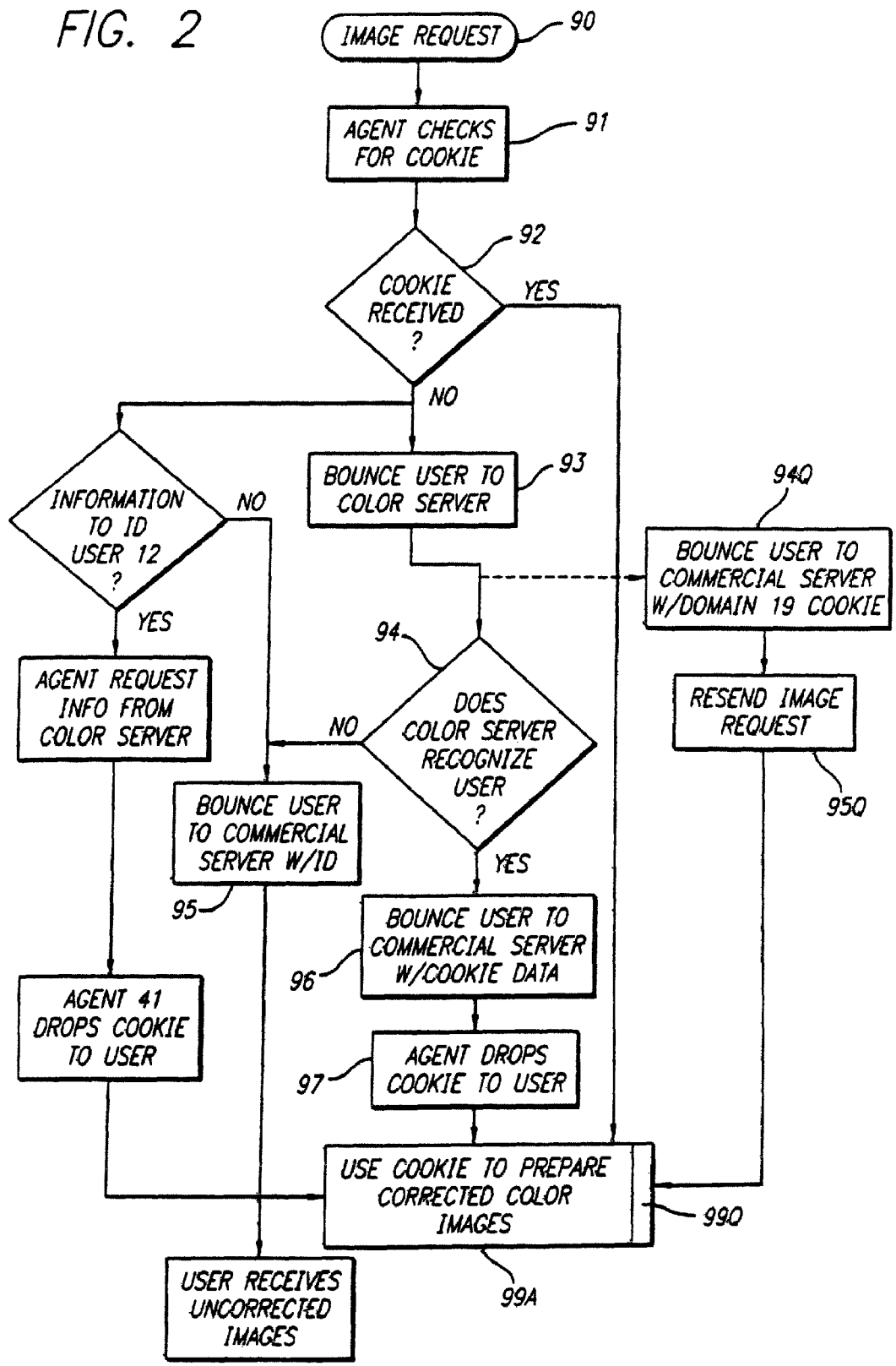

FIG. 5B
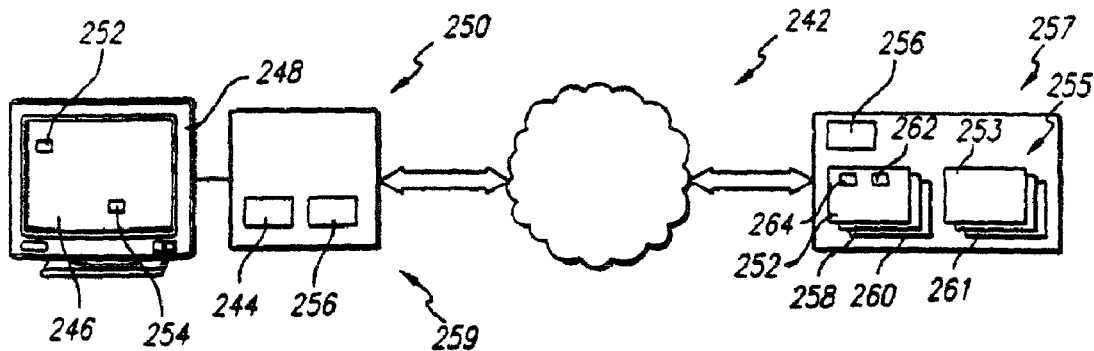
FIG. 6A
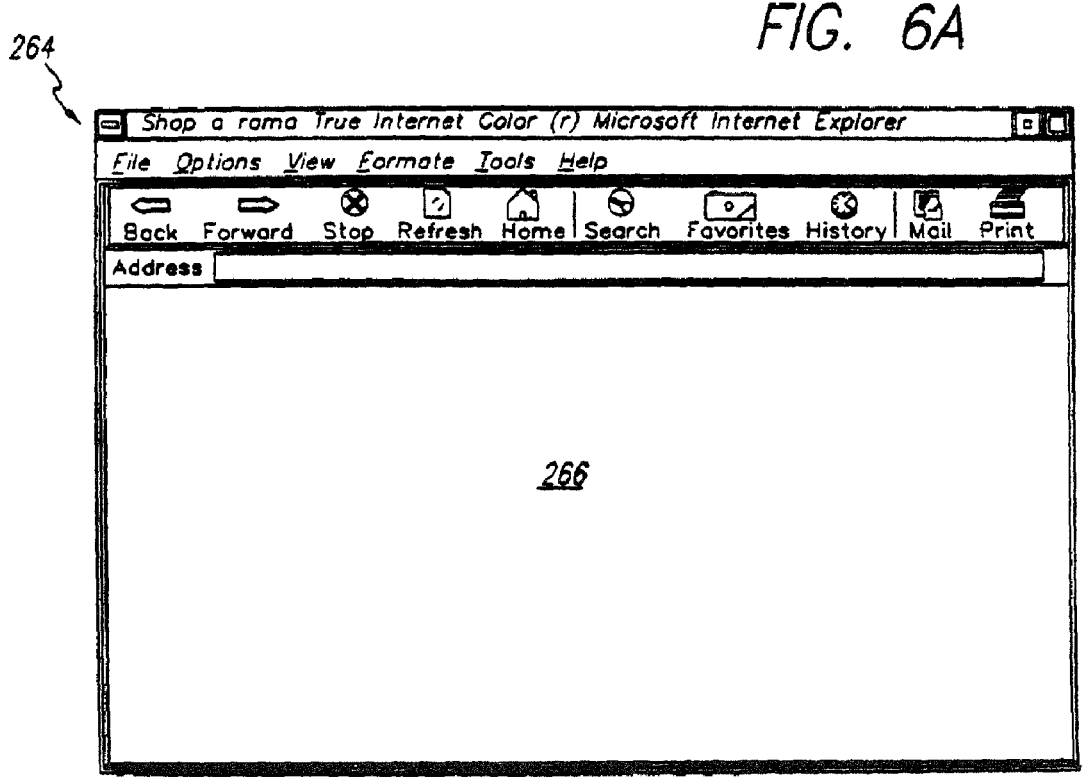
FIG. 6B
```
<HTML>
<HEAD>
<TITLE> SHOP-O-RAMA TRUE INTERNET COLOR(R)</TITLE>
</HEAD>
</HTML>
```

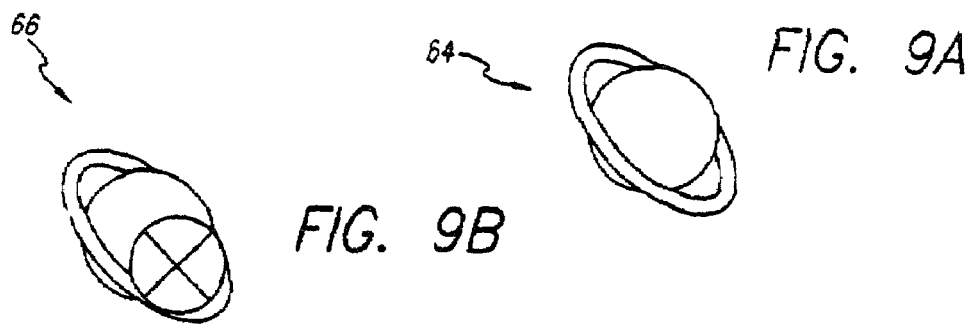
FIG. 9A
FIG. 9B
FIG. 10
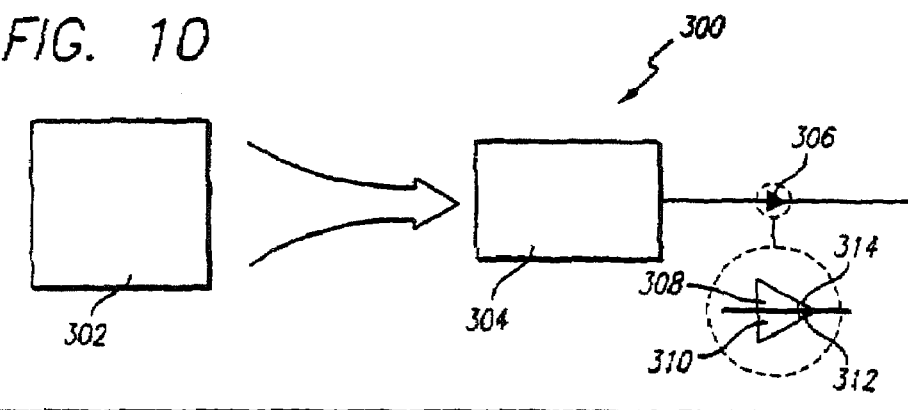
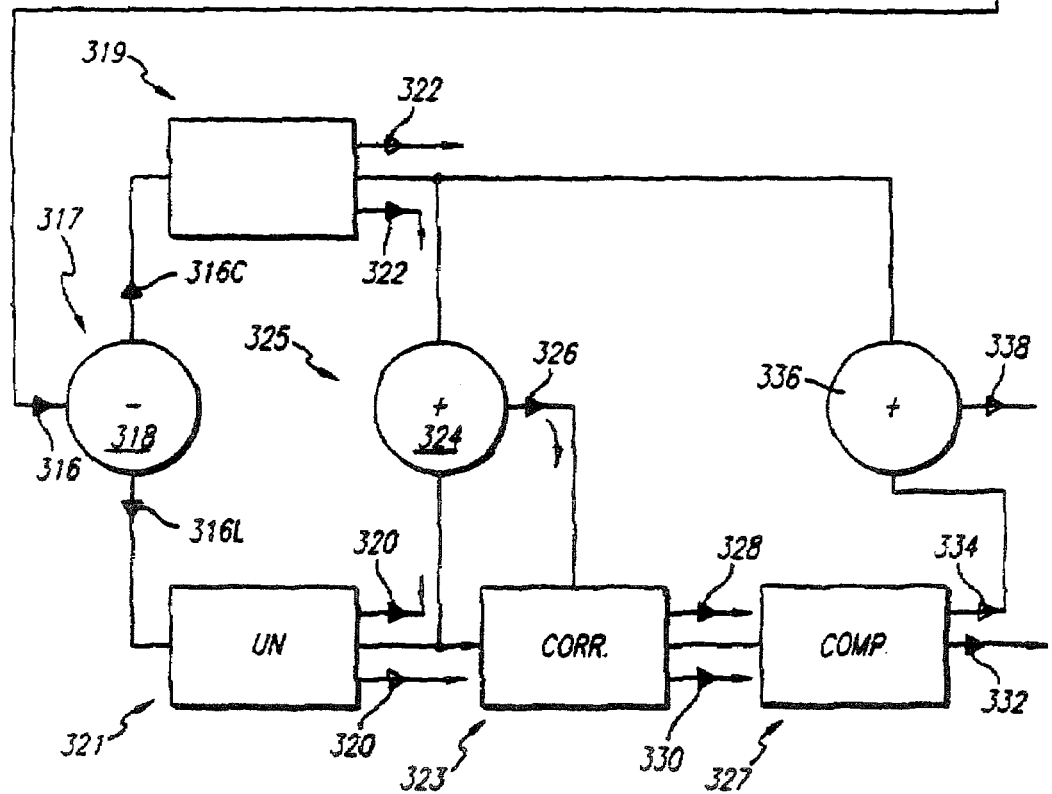

METHOD AND SYSTEM FOR IMPROVED INTERNET COLOR

RELATED APPLICATIONS

The present patent application is a Continuation of U.S. application Ser. No. 09/803,219 filed Mar. 7, 2001, which is U.S. Pat. No. 7,339,595, issuing on Mar. 4, 2008. This application is a continuation-in-part of U.S. patent application Ser. No. 09/439,482 filed Nov. 12, 1999 now U.S. Pat. No. 7,177,466, which is a continuation-in-part of U.S. patent application Ser. No. 09/422,215 filed Oct. 19, 1999 U.S. Pat. No. 6,693,647 and claims the priority of provisional application Ser. No. 60/108,444 filed Nov. 13, 1998, Ser. No. 60/108,442 filed Nov. 13, 1998, and Ser. No. 60/108,229 filed Nov. 13, 1998.

BACKGROUND

1. Field of the Invention

This invention relates to image display over a network, and more specifically to improved image color display over a network.

2. Background of the Invention

Most color correction schemes require the characterization of the image source and image destination/target display systems. The color correction adjusts the colors of an image to make it appear on the destination system such that it closely resembles the colors as displayed on the source system. These color correction systems typically improve the color rendering or reproduction and tone rendering/reproduction of the images.

However, it is not always possible to obtain the characterization of each individual destination display in order to provide completely accurate color correction using these systems. It would be beneficial to the user (destination display) if the accuracy of the color corrected were improved compared with no color-correction.

BRIEF DESCRIPTION OF THE DRAWINGS

FIG. 2 is a flow chart of the process of the present invention.

FIG. 5B is block diagram of a network according to the present invention.

FIG. 6A is a screen view of a web page according to the present invention.

FIG. 6B is block diagram of an HTML file according to the present invention.

FIG. 9A is an enlarged view of an indicator according to the present invention.

FIG. 9B is an enlarged view of an alternate indicator according to the present invention.

FIG. 10 is a block diagram of an alternate embodiment according to the present invention.

The features and advantages of this invention will become apparent from the detailed description and accompanying figures that follow. In the figures and description, numerals indicate the various features of the invention, like numerals referring to like features throughout both the drawings and the description.

DETAILED DESCRIPTION OF THE PREFERRED EMBODIMENTS

Figure 1:
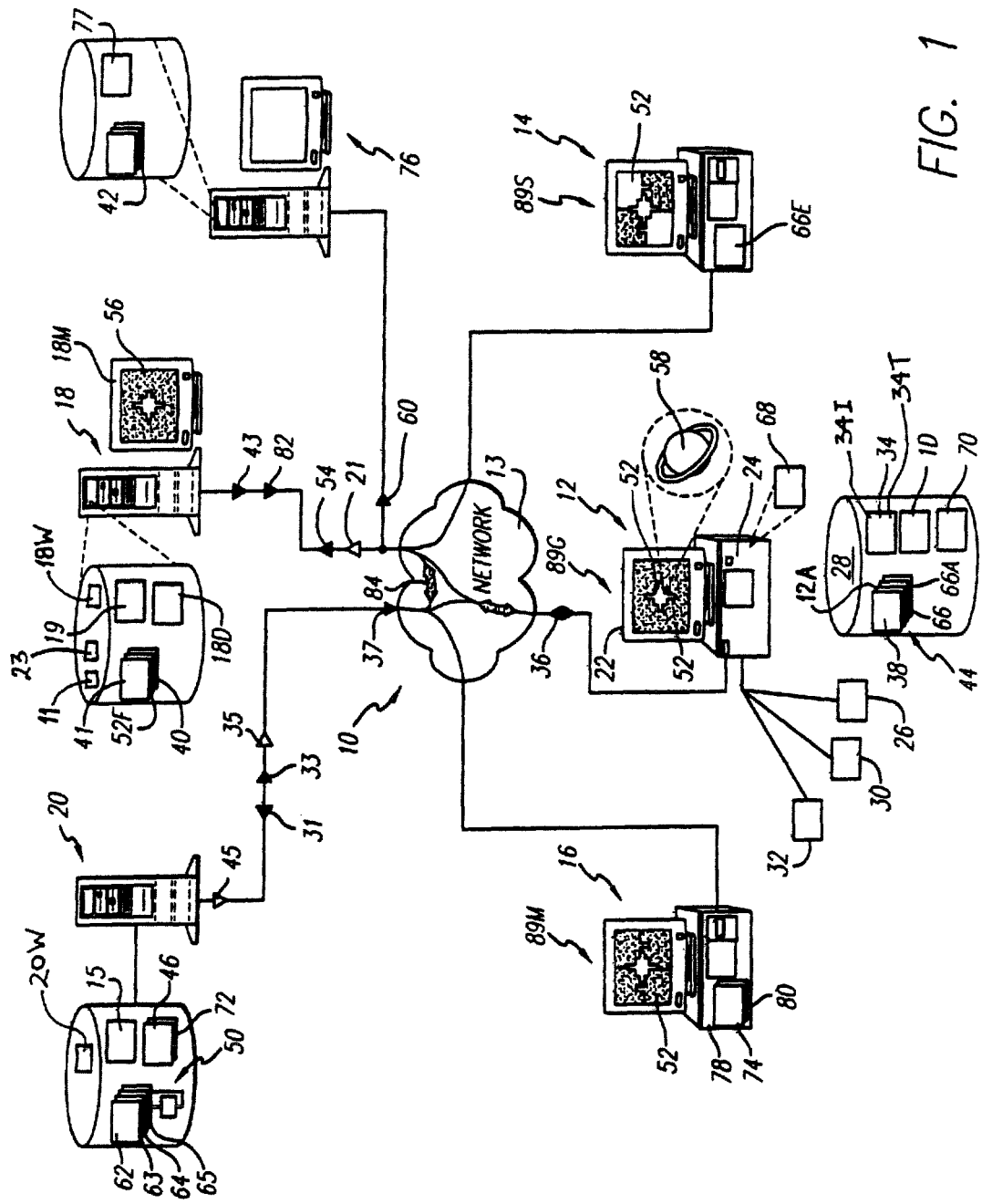
FIG. 1 is a stylized block diagram of a network according to the present invention.

Referring now to FIG. 1, system 10 according to the present invention provides color images from network servers to users enhanced when possible with user specific color correction information to provide high fidelity color images to the users. In particular, in accordance with a preferred embodiment of the present invention, color server 20 may provide color catalog pages for clothing or other products to a potential buyer, such as user 12, adjusted to provide high fidelity color images in accordance with the color display characteristics of display 22.

In general, system 10 may include one or more network servers and one or more users. Network servers may include color server 20, commercial server 18, and server 76. Users may include users 12, 14 and 16, interconnected to network servers using network 13. Network nodes such as color server 20 may serve as a user or client for some purposes and a server for others. System 10 does not require a static server, constantly functioning as a server, in all embodiments, additionally, servers may also be composed of multiple machines.

Network 13 may be any type of network such as a LAN, intranet or an internet such as the World Wide Web (WWW). Network 13 may also utilize any type of appropriate network protocol, such as HTTP as used on the World Wide Web. Color server 20 may be used to host color correctable images 50 to be made available to users of commercial or other network sites.

User 12 may be any conventional network client device and may include one or more electronic devices 24, conventionally a personal computer or workstation, and one or more display devices 22, conventionally a CRT or LCD display monitor. User 12 may also include remote storage 26 and/or local storage 28 within electronic device 24. Remote storage 26 may also be available to electronic device 24 through network 13. User 12 may also include one or more output devices 30 which may be any type of printer, recorder or plotter. User 12 may also include one or more input devices 32 which may be any type of scanner, reader, image capture device or other data transfer device.

Delivery of accurate images according to the present invention begins with image request 54 sent to commercial server 18 for the display of image 56 on monitor 22 as image 52. Image request 54 may originate with user 12 or any network device such as server 76. Image request 54 may be an individual request for a specific image, graphic, drawing, rendering or similar data file or it may be part of a larger data request such as a web page request. Commercial server 18 may respond to image request 54 by then inquiring of the source of the image request to determine if display calibration or characterization data 38 for display 22 is available.

If display calibration or characterization data 38 is available to commercial server 18, a color corrected version of image 56 may be provided to user 12 in accordance with data 38. Thus, image 52 as then displayed on display 22 may be a more accurate color representation of a reference or author image, image 56 than may otherwise be achieved. Image 56 may be corrected from any conventional format including but not limited to rendering formats such as PCL and PDF, image formats such as JPEG 2000, AVI, MPEG 2, MPEG3, MPEG4, Quick time, Real Media, VRML, ART, WMF, FPX, BMP, PCX, TIFF, GIF, flash, or postscript.

Concurrent with delivery of color corrected images, display 22 may present a visual or other indicator 58, indicating that the image or images being viewed are color corrected and accurate. Indicator 58, or a variation thereof, may also be used to indicate when images are not color corrected and/or provide other information to user 12, a network server or a network administrator. An online shopper or other user may have increased confidence to make purchases, as a result of viewing image 52 over network 13, knowing the color of image 52 as actually viewed is accurate.

If display calibration or characterization data 38 is not available to commercial server 18, user 12 may be invited to calibrate or characterize display 22 through network 13 with or without requiring plug-ins or downloads. Calibration may be accomplished from any network server 18 or from color server 20 or from a local agent 12A. Without display calibration or characterization, image 52 may appear differently to users 12, 14 and 16 because of different operating systems, video cards, monitor settings and a range of other factors.

According to the present invention, process 131 as discussed below may be a one-time process, involving images 62-65 and nine user interactions that may be mouse clicks, key presses, screen contacts or other interactive inputs to electronic device 24. Process 131 may include other combinations or techniques to characterize a display system or capture other personalization data. Process 131 may generally require 1 to 2 minutes to complete, some circumstances may require more time. After completion of process 131, user 12 may receive color corrected images without further setup. Discussions throughout that refer to color correction should be understood to apply equally to gray scale correction. A characterizable and correctable network system according to the present invention may also be used to control delivery and ensure the accuracy of sounds, smells, tastes and textures.

Commercial Element

Referring again to FIG. 1, according to the present invention agent 41 may be implemented as image director 11 or as filter 23 resident on commercial server 18. Filter 23 may modify the URL of an image element of an HTML page according to the characterization of the display system of user 12. Image director 11 may redirect the image request URL generated by the delivery of the requested HTML to user 12.

Data Block Sharing

Referring again to FIG. 1, calibration or characterization data 38 must be made available across multiple network domains for convenient use to correct and distribute images 40 or 42 across network 13. Some network protocols such as the HTTP protocol used on the WWW are able to store data blocks on user 12 or other network devices. Data block 34 may include many different types of information including, user preferences and user hardware characteristics conventional techniques providing client-resident data block storage are often referred to as providing "Cookies". In addition, user cookie data may also be deposited on one or more network machines for access by other network servers across the network and to refresh user cookies should they become purged or otherwise unusable.

Cookie 36 may include one or more blocks of information passed from a server and stored on a user, often as a result of the collection of that information by the server from the user. Cookie 36 may then be used to provide, or retrieve, information from a user to a server. For example, user 12 information concerning domain 77 may be passed from server 76 to user 12 and stored on user 12 as cookie 66. Subsequent connection of user 12 to server 76 would prompt server 76 to request cookie 66 to remind server 76 of information about user 12. This technique is conventionally used to provide personalized settings or information specific to user 12 on server 76 without requiring server 76 to store the data information for all its users. For security purposes, conventional cookies are designed so that they cannot be shared across multiple domains. Conventional cookies may even be limited to URL ranges within a domain, as is the case with the HTTP protocol. In a conventional network, a server in a first domain cannot access cookies stored for another domain.

Conventional cookie techniques have not therefor be useful for providing display characterization and/or calibration information about a user to a server unless the cookies are specific to that server, that is, unless the server has placed the cookies on the user. In accordance with the present invention however, various techniques of server and user redirection may be used to achieve results equivalent to sharing cookies across domains.

For example, if user 12 initiates request 60 to server 76, server 76 may request data block 34 from user 12 to process request 60. Data block 34 may include personal, preference, calibration and/or characterization information related to user 12, as well as a time tag 34T or stale/fresh timer to permit synchronization of correction/characterization or other information across the network. Data block 34 may also include index 34I to database 46 permitting information 45 to be retrieved from database 46. Other index information may also be included to permit regeneration of data blocks purged from a client machine.

Referring now to FIG. 2, a method of sharing data blocks according to a first embodiment of the present invention begins at step 90 with request 54 from a user 12. According to the present invention, users 12, 14 and 16 may exist in one of three conditions. Standard condition 89S, in which no characterization and/or calibration has been performed, Correction Enabled condition 89C, in which characterization and/or calibration has been performed according to the present invention, Modified condition 89M, in which characterization and/or calibration has been performed not according to the present invention.

At step 91, agent 41 checks user 12 for a cookie 66.

At step 92 agent 41 determines if a cookie has been received. If no cookie is received, user 12 may be assigned a unique identifier ID and may be redirected or bounced to color server 20 at step 93. Bouncing may be accomplished using Java script or it may be accomplished using HTTP redirect or other suitable technique. A currently preferred embodiment of the present invention uses Java script.

If agent 41 receives cookie 66 from user 12, agent 41 and commercial server 18 have enough information to provide user 12 with color corrected information at step 99A as requested in image request 54.

At step 94 color server 20 checks user 12 for a domain 15 cookie. If no domain 15 cookie is present, user 12 is given a global identifier GI and is bounced to color server 20 at step 95. The existence of unique identifier ID signifies to agent 41 that user 12 is not characterized and/or calibrated, and that corrected images may not be prepared for user 12 using existing information.

One or more network servers 18 may include watchdog 18W to monitor the status of color server 20. If color server 20 is unavailable, time tag 34T may be extended until color server 20 is available. If a user has only unique identifier ID user 12 may get a blank or marker cookie 34B until color server 20 is again available. Upon the return to service of color server 20 the next interaction of a user with an extended time tag 34T will update data block 34 and a user 12 with a blank or marker cookie 34B will obtain a usable data block 34.

At step 96, if color server 20 detects a domain 15 cookie 66A in user 12, user 12 is bounced to commercial server 18 along with display calibration or characterization data 38.

At step 97 agent 41 drops cookie 66C to user 12. Agent 41 uses the contents of cookie 66c to provide a corrected image 52 to user 12 at step 98.

Referring again to FIG. 2, a method of sharing data blocks according to a second embodiment of the present invention begins at step 90 with request 54 from a user 12.

At step 91, agent 41 checks user 12 for a cookie 66.

At step 92 agent 41 determines if a cookie has been received. If no, user 12 is bounced to color server 20 at step 93.

If agent 41 receives cookie 66 from user 12, agent 41 and commercial server 18 have enough information to provide user 12 with color corrected information at step 99A as requested in image request 54.

At step 94Q user 12 is bounced to commercial server 18 along with domain 19 cookie 66Q. At step 95Q image request 54 is resent. At step 96Q, agent 41 detects domain 19 cookie 66Q. Commercial server 18 may use 66Q and image file 52F to provide user 12 with color corrected information at step 99Q as requested in image request 54

Referring again to FIG. 2, a method of sharing data blocks according to a third embodiment of the present invention begins at step 90 with request 54 from user 12.

At step 91, agent 41 checks user 12 for a cookie 66.

At step 92 agent 41 determines if cookie 66 or information 92I has been received. If cookie 66 is not present and information 92I is present, agent 41 becomes a user and requests characterization and/or calibration information for user 12 from color server 20. Information 92I must be enough information to permit to color server 20 to recognize user 12 as the beneficiary of the surrogate client action of agent 41.

If agent 41 receives display calibration or characterization data 38 from color server 20, agent 41 drops cookie 66R to user 12. Using cookie 66R, agent 41 and commercial server 18 have enough information to provide user 12 with color corrected information at step 99A as requested in image request 54.

Nodes connected to network 13 may include various combinations of displays and electronic devices and may also include a variety of video hardware 68 and video software 70. Video hardware 68 may include video cards, boards, chips and accelerators. Video software 70 may include drivers, applets and applications.

Display calibration and/or characterization data 38 does not exist for user 14 in standard condition. Thus, user 14 may not receive color corrected images according to the present invention. Request 54 from user 14, requesting image file 52F from commercial server 18 will cause agent 41 to initiate examination 82. Examination 82 may be a request for a cookie or calibration and/or characterization data, and will not yield any calibration and/or characterization data of any form from user 14. Agent 41 may be implemented as a software filter, an application or any other suitable technique.

User 14 has no calibration and/or characterization data to return to commercial server 18. Upon receiving no calibration and/or characterization data in response to examination 82, agent 41 may transmit response 43 to user 14. Response 43 may cause user 14 to transmit request 31 to color server 20. Server 20 has no calibration and/or characterization data to return and may transmit response 33 to user 14. Response 33 may include a unique identifier ID to identify user 14 and cause commercial server 18 to drop a cookie 66E to user 14. Cookie 66E may be considered an empty cookie, it contains only unique identifier ID and will not allow commercial server 18 to produce corrected images to user 14.

Alternatively, missing, inadequate, corrupted or otherwise unusable calibration and/or characterization data from color server 20 may initiate inquiry 35 from color server 20 to user 14. Inquiry 35 may be an invitation or other initiation to user 14 to engage in remote or local calibration and/or characterization. If user 14 declines to calibrate or characterize, image 52 displayed by user 14 would be uncorrected.

User 12 may be calibrated and/or characterized locally or remotely. Local calibration and/or characterization is discussed in U.S. Pat. No. 5,638,117 to Engeldrum & Hilliard. Remote calibration and/or characterization is discussed in more detail below. After calibration and/or characterization according to the present invention, display calibration or characterization data 38 may be stored locally on local storage 28 of user 12 and/or stored remotely in database 46 on color server 20 or as data file 72. Calibration and/or characterization data 38 may be stored as cookie 66, a block of data, or some similar method using other network protocols. Database 46 may exist only on color server 20 or may be parsed onto or duplicated on one or more network machines.

Request 54 from user 12, requesting image file 52F from commercial server 18 will cause agent 41 to initiate examination 82. Examination 82 may initiate return of cookie 66 to commercial server 18 if cookie 66 was initially generated by an element within domain 19. Examination 82 may also initiate return of display calibration or characterization data 38 to commercial server 18. Return of either cookie 66 or display calibration or characterization data 38 may permit commercial server 18 to correct image file 52F for display on display 22 as image 52.

If cookie 66 was deposited by a foreign domain and is inaccessible, or display calibration or characterization data 38 is missing or inaccessible, examination 82 may return no data. Upon receiving no calibration and/or characterization data in response to examination 82, agent 41 may transmit response 43 to user 12. Response 43 may cause user 12 to transmit request 31 to color server 20. Request 31 may Color server 20 may transmit response 37 to user 12 which causes user 12 to transmit data 21 to commercial server 18. Data 21 may contain display calibration or characterization data 38 and/or other user profile information.

In modified condition, user 16 may have been calibrated and/or characterized locally or remotely to generate a foreign calibration and/or characterization file 74. Foreign calibration or characterization data 74 may be stored locally in electronic device 78 or stored remotely. Calibration and/or characterization data 74 may be stored as cookie 80, a block of data, or some similar method using other network protocols. Agent 41 may detect foreign calibration and/or characterization file 74 or cookie 80. Upon detection of cookie 80 or foreign calibration and/or characterization file 74 agent 41 may translate the foreign files to translated data 84 to enable correction of images according to the present invention. Alternatively, agent 41 may also bounce user 16 to color server 20 along with translated data 84 to enable color server 20 to drop translated data cookie 86 onto user 16. Translation of foreign calibration and/or characterization file 74 or cookie 80 may also be accomplished by color server 20.

The above process may be repeated as many times as necessary in order to satisfy requests made of a server by a client.

The domains enumerated above need not be distinct from each other. For example, a domain that has a cookie it wishes to share and the domain that distributes the cookie could be the same domain. Likewise, the domain that has a cookie to share, the domain that distributes the cookie, and the domain that requests the cookie could all be the same domain as well, data block sharing according to the present invention might be required if a domain and its cookies are partitioned by URL ranges.

The act of sending the client from one domain to another in order to retrieve information may be done using any of a multiplicity of methods including the use of a page description language including HTML or XML, by using some scripting language such as JavaScript or VBScript, or by some combination of the above. For example, HTML tables using HTTP POST or HTTP GET commands can be used in conjunction with JavaScript or VBScript to automate inter-page, and thus inter-domain, transfers.

Methods of supplying the information returned by a cookie sharing server may include, but are not limited to, responses to forms, additional URL header fields, or additional cookies in a URL's domain.

Guardian Cookies

Figure 20A:
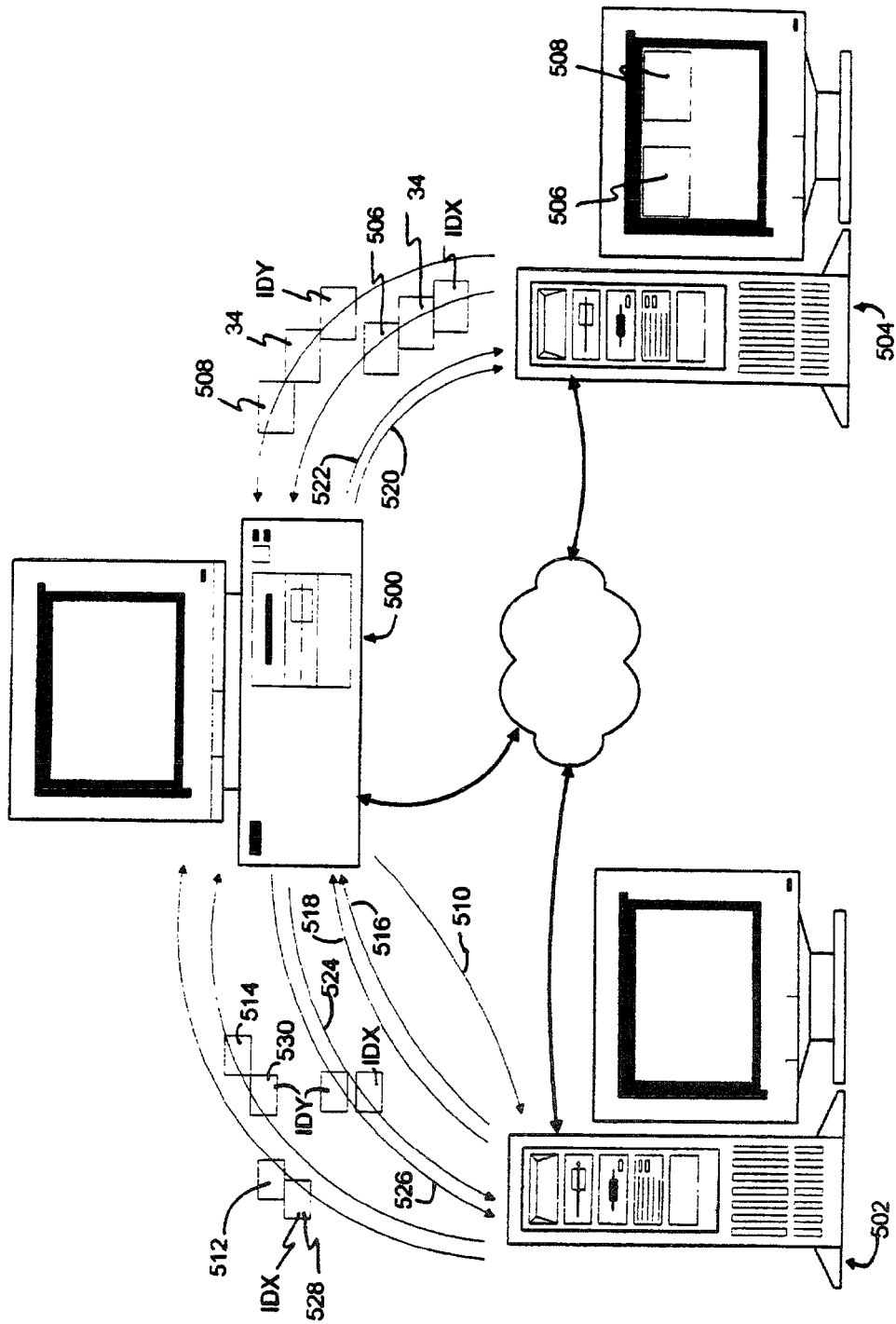
FIG. 20A is a diagram of a guardian cookie redirection according to the present invention.
Figure 20B:
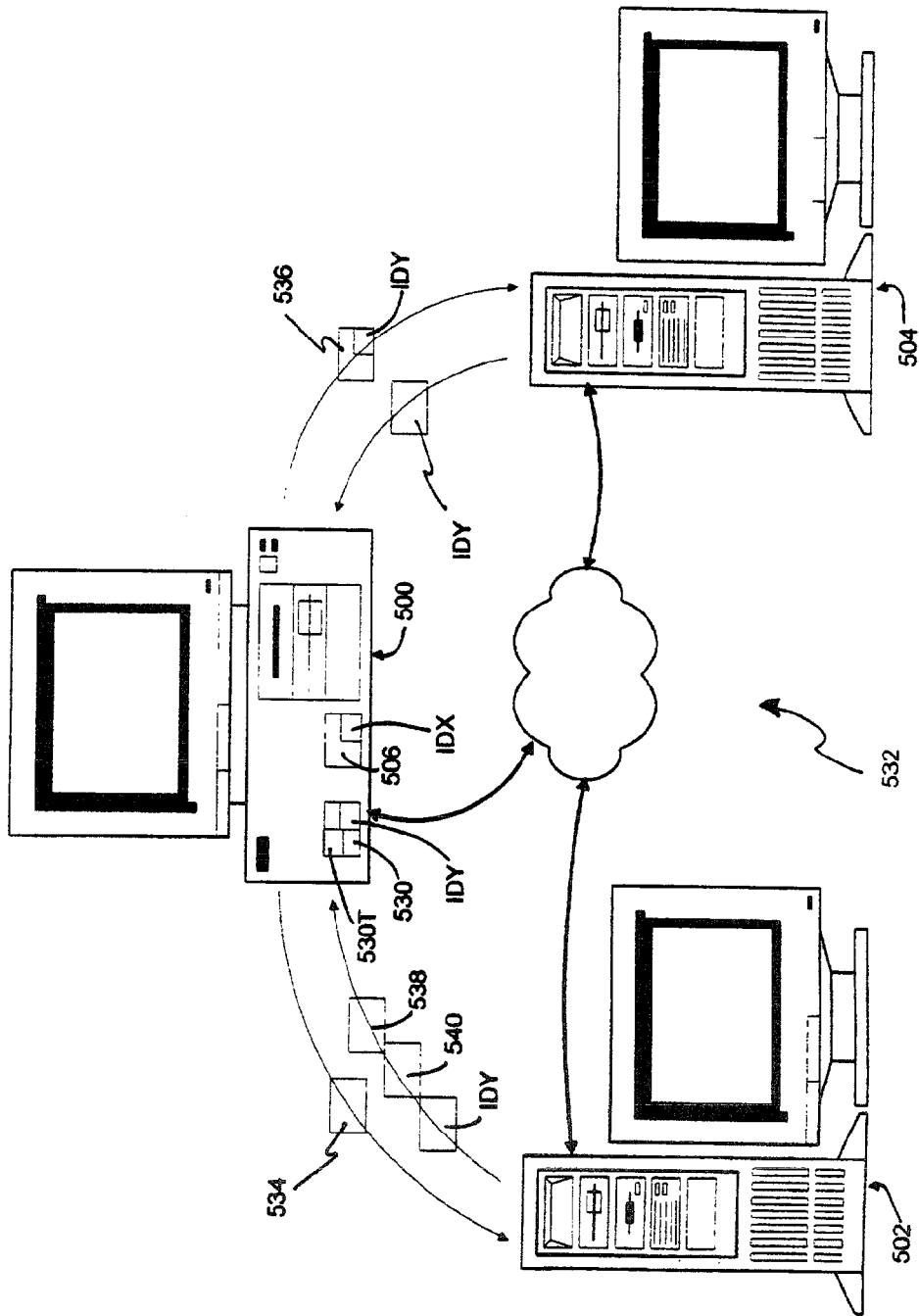
FIG. 20B is a diagram of a guardian cookie cleanup according to the present invention.

Referring to FIGS. 20A and 20B, the process of redirecting a network user 500 from a network machine 502 to another network machine 504 to obtain images 506 and 508 according to the present invention may initiate multiple parallel image requests if image request 510 is for a web page or other image composed of multiple discrete image files. As a result of multiple image requests from an uncharacterized user 12 multiple cookies or data blocks 34 may be deposited on user 12, each data block 34 having a different time tag 34T. In another embodiment of the present invention, guardian cookies 512 and 514 may be used to avoid a user being assigned multiple unique identifier ID by each network machine.

For example, user 500 may be uncharacterized or simply unknown to both network machine 502 and network machine 504. Request 510 from user 500 may generate multiple parallel image redirections 516 and 518. Image redirections 516 and 518 may generate image requests 520 and 522 respectively from user 500 to network machine 504. If requests 520 and 522 do not include data block 34 network machine 504 may assign each request a unique identification, thus request 520 may result in image 506 being sent to user 500 along with a data block 34 including unique identifier IDX. Request 522 may result in image 508 being sent to user 500 along with a data block 34 including unique identifier IDY. The last data block to arrive at user 500 will overwrite previous data blocks thus for example data block 34 with IDX may be the last to arrive and the data block to survive. Relative to network machine 504 user 500 has retained unique identifier IDX.

Arrival of each image 506 and 508 and the associated data block initiates notices 524 and 526 respectively to network machine 504. Each notice includes the unique identifier which initiated it. Arrival of notice 524 and notice 526 causes network machine 502 to send guardian cookies 512 and 514 respectively as well as data cookies 528 and 530 respectively to user 500, each guardian cookie including includes the unique identifier which initiated it. The last of data cookies 528 and 530 to arrive at user 500 overwrites any previously saved cookies from network machine 502 for this example assume that data cookie 530 and unique identifier IDY overwrite data cookie 528 and unique identifier IDX. Thus user 500 includes data block 34 and IDX form network machine 504 and data cookie 530 and IDY and guardian cookies 512 and 514.

As discussed elsewhere, upon expiration of time tag of data cookie 530 user 500 may initiate a cookie refresh with network machines 502 and 504 and the presence of guardian cookies 512 and 514 indicates that user 500 may be in possession of multiple identifiers.

Referring now to FIG. 20B, expiration of timer 530T may be one of several triggers that will prompt cookie refresh cycle 532. User 500 may transfer data 534 to network machine 502 indicating the expiration of timer 530T. Network machine 502 may poll user 500 and discover the presence of more than one guardian cookie such as guardian cookies 512 and 514 and that data cookie 530 and unique identifier IDY were the last to arrive at user 500 and thus are the repositories of the data and ID respectively for user 500. User 500 may then be redirected to transfer to network machine 504 unique identifier IDY which may also be accompanied by a request for a cookie refresh. Unique identifier IDY is one of several unique identifiers that were transferred to user 500 with the parallel image requests that created the race condition, thus unique identifier IDY is a recognized value therefor user 500 is also recognized. Network machine 504 drops updated cookie 536 which may also contain unique identifier IDY to user 500. Updated cookie 536 overwrites data block 34 and overwrites unique identifier IDX with unique identifier IDY. As a result both network machine 502 and network machine 504 agree that user 500 is represented by unique identifier IDY and now has the latest data from network machine 504 in the form of updated cookie 536. User 500 then transfers data from updated cookie 536 to network machine 502 prompting network machine 502 to drop new cookie 538 and guardian cookie 540 and unique identifier IDY. New cookie 538 overwrites data cookie 530 and guardian cookie 540 overwrites guardian cookies 512 and 514. The presence of only one guardian cookie serves to indicate that both network machine agree on the ID of user 500.

Remote Characterization

Figure 3A:
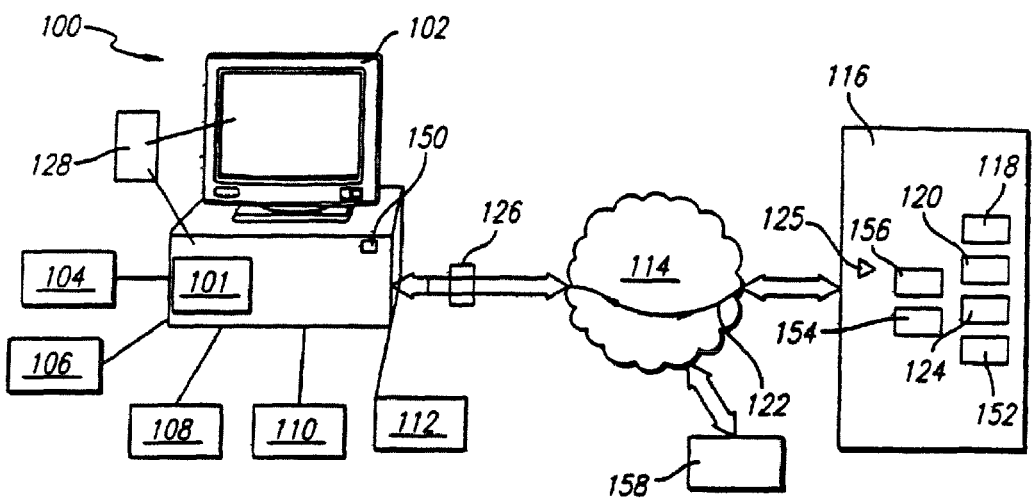
FIG. 3A is block diagram of a network according to the present invention.

Referring now to FIG. 3A, a user of a local computer 100 may desire characterization and/or calibration of one or more input/output devices such as display 102, scanner 104, other image input device 106, printer 108, plotter 110, or other image output device 112. Computer 100 may be connected via a wired or wireless network such as network 114 or directly via modem or cable or other means to a remote server 116 where software 118 and data 120 needed for characterization may be stored.

After link 122 is established between a Remote Server 116 and computer 100, either server 116 or computer 100 may request characterization and/or calibration service from a remote server on behalf of computer 100. Server 116 may then initiate a characterization program 124. Characterization program 124 may send one or more characterization images 126 or test patterns to computer 100 and its associated devices 102, 104, 106, 108, 110, and 112. If the device to be characterized is an output device such as display 102, printer 108, plotter 110 or image output device 112, characterization or test image 126 may be presented to a user or a local calibration mechanism 128 using computer 100's manner of output onto the selected device.

If the device to be characterized is scanner 104, image capture device 105 or other image input device 106, characterization or test image 126 may be presented to the user or local calibration mechanism 128 using a conventional input from the device to be characterized and a conventional output onto display 102 or any other device.

Figure 3B:
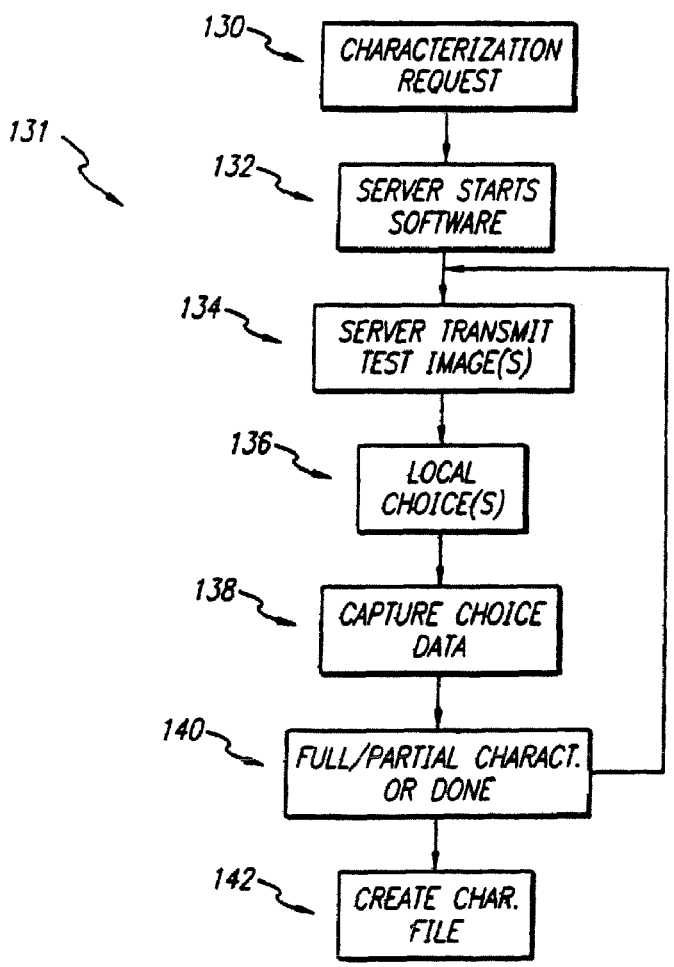
FIG. 3B is a flow chart of the process of the present invention.

Referring now to FIG. 3B, a process 131, of remotely characterizing display 102 according to the present invention begins at step 130 with a request 125 for characterization that may be initiated by computer 100 or server 116. At step 132, based upon request 125, server 116 initiates characterization program 124. At step 134, characterization program 124 through server 116 transmits image 126 or other test pattern which may then be presented to the user or local calibration mechanism 128 on display 102 or other device to be characterized. At step 136 a user or local calibration mechanism such as calibrator 128 may make one or more choices based on the image or test pattern as it appears on display 102. Choices made by a user may be made in any conventional manner as through keyboard or mouse entry or any other suitable tactile feedback device, a user may also indicate their preferences in other ways such as verbally. At step 138 the choice or choices may result in choice data 150 or other quantifiable data that may be captured locally and/or communicated back to characterization program 124 on server 116 for capture.

One of the choices to be made by a user may be to select a level of thoroughness of the characterization and/or calibration. Characterization program 124 may provide one or more options for device characterization including full or partial characterization, or multiple levels of characterization complexity. At step 140 characterization program 124 determines if a sufficient number of images or test patterns have been sent to computer 100, and if a sufficient number of responses have been captured to complete the level of characterization desired. In another aspect of the present invention characterization program 124 may also evaluate choice data 150 to determine if sufficient data has been received to adequately characterize computer 100 at the desired level. If insufficient data has been captured characterization program 124 may repeat process 131 from step 134 until sufficient choice data has been captured.

After choice data 150 has been transmitted to server 116, choice data 150 may be used by characterization program 124 or other electronic algorithm to create characterization file 152 about the device to be characterized.

Characterization file 152 might be used for one or more of the following applications:

a) send characterization file 152 to computer 100 for local usage including, but not limited to, providing operating system 101 of computer 100 with information about the color capabilities of computer 100; and/or b) subsequently use characterization file 152 or other characterization information for modifying or otherwise controlling the flow of images such as still image 154 or streaming images 156 for display, output or other use by computer 100 based on the contents of characterization file 152; and/or c) store characterization file 152 or other characterization information locally on a network node such as server 116 or other computers connected to server 116; and/or d) send characterization file 152 or other characterization information to a third location such as server 158; and/or e) feed into creation or alteration of the test patterns, images, or other calibration and characterization implement such as image 126; and/or f) otherwise provide characterization file 152 or other characterization information for use by software 118, other programs, or other devices in providing images or other services to computer 100.

Figure 4:
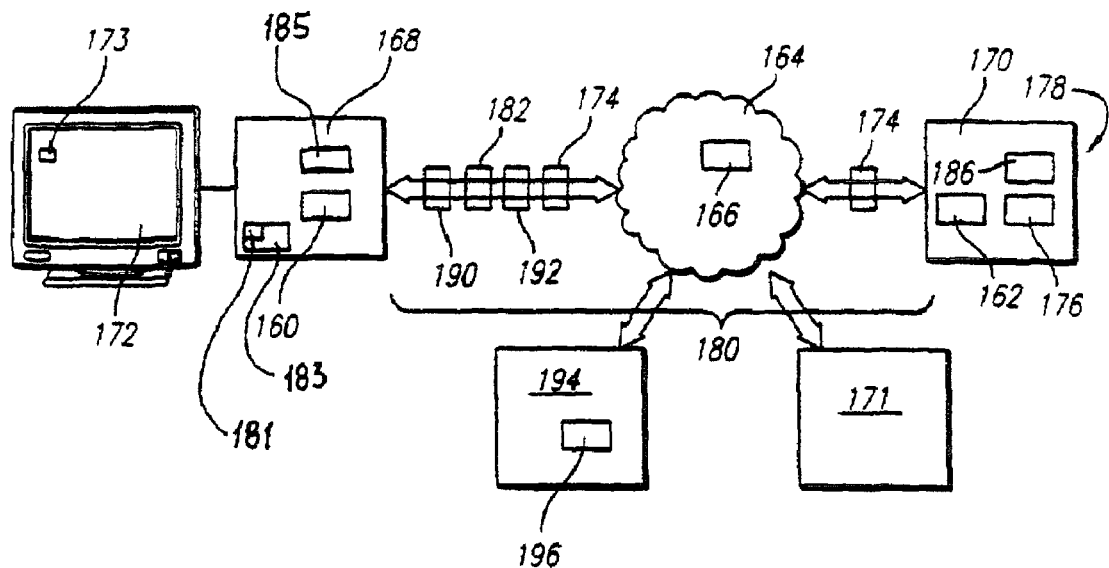
FIG. 4 is block diagram of a network according to the present invention.

Referring now to FIG. 4, in another aspect, the present invention may include a combination of client software 160 and server software 162 connected using network 164 and using suitable network protocols such as Internet protocols 166. It is expected that many individual local computers such as computer 168 may from time to time connect to any of a number of remote servers such as server 170 over a network such as network 164 which may be the Internet. At computer 168 with display 172 as the device to be characterized, a user may initiate a request such as request 174 to server 170. Server 170 may incorporate images, data, test patterns, and/or logic embodied in onto an appropriate hardware platform 178.

Program 176 or other suitable characterization programs may do one or more of the following:

(a) manage communication link 180 with computer 168, (b) select one or more appropriate characterization images and/or test patterns or other test data such as image 182 to be sent to the device to be calibrated. The selection of appropriate test images may be determined by the level of complexity of characterization desired, by the hardware to be characterized, by the characteristics of the connection, or by characteristics of images to be displayed.

(c) create, change or alter existing calibration images or test pattern to send and/or change the order thereof if required, (d) send one or more calibration images and/or test patterns, (e) collect characterization and/or calibration data such as choice data 184 returned from computer 168, (f) create characterization information such as characterization file 186 from analysis of the images or test patterns such as image 182 sent and from the responses such as choice data 184 received, (g) store characterization file 186 on server 170 and/or connected machines such as server 171, (h) use characterization file 186 to modify images such as image 190 or to change the flow of unmodified images such as images 192 sent to computer 168

(i) transmit characterization file 186 to other sites such as site 194 for use at those sites to provide services such as data 196, which may include programs, data and/or images, to computer 168 or other purposes, and/or (j) transmit characterization file 186 to computer 168 for local usage.

For example, the present invention might be used as a technique to characterize client monitors over the Internet and to use the characterization information to color correct images sent to that client so as to provide accurate color display over the Internet.

Page Title Signaling

In a still further embodiment, the present invention enables a server application to signal a client application or hardware outside of normal browser communication channels such as a dead drop. Thus a client application may monitor URLs arriving at the client browser and an encoded message in an arriving URL may be used to trigger a client application to perform a predetermined action or actions. In addition to dead drop signals, a URL may have encoded information to trigger the browser or other client application to perform one or more of many actions such as modify color depth. A URL may also include many other encoded information such as subset parameters or other client or server information.

Correction Notification

In another aspect of the present invention, computer 168 may be provided with icon 173 or other suitable notification to indicate the color correction status of images on display 172. Display 172 may be a conventional CRT or other suitable image display device such as LCD, flat panel, digital ink, or printer to paper or film. Information describing or notifying a user or other element of a network about the relative or absolute condition of an image is critical since the end user is often in a remote location, separated in time and distance from the author of the image or images, and unable to know the characteristics of the image or images being viewed. In particular, the present invention may automatically inform viewers and/or other receivers of digital images as to the state of color correction for the images, or one or more of the color metric states such as white point or gamma or others, thus notifying a viewer of the visual integrity of the image being displayed. Consequently, viewers may feel assured and secure about images they see as to the accuracy of those images.

Image status 183 or accuracy of image 182 may be determined relative to an authoring image and may include one or more image characteristics or metrics 181 such as white point, gamma, black point, luminance or other suitable characteristic. Image 182 may be either digital or analog. Alternatively, image status 183 of image 182 may be determined as an absolute or relative value.

In particular, the present invention may be implemented as a software process 185 that may be a stand alone application or it may be loaded into either an Internet browser or server technology. Alternatively the present application may be implemented as a hardware or software function of the operating system, or it may be a strictly local application such as on a photo CD. A browser is a client application that enables a user to view HTML (or equivalent) documents on the World Wide Web, another network, or the user's computer. The software may be implemented in the form of a set of executable code such as a small program or an applet, including Java or ActiveX application programs, that may be loaded into a web browser, such as Microsoft's Internet Explorer or Netscape's Navigator or other suitable application. The software may also be implemented on server 170. The present invention may be incorporated in server code such as Cosmo Color from Silicon Graphics or other suitable application. One skilled in the art will recognize that other conventional or newly developed software processes may be used as well and the invention may be implemented using hardware or a combination of hardware and software. One skilled in the art will recognize that the invention can apply to other is browser technology, such as local CD browsers and other non-Internet browsers and may use HTML or other markup languages such as but not limited to XML/XSL, XGML or DHTML.

Figure 5A:
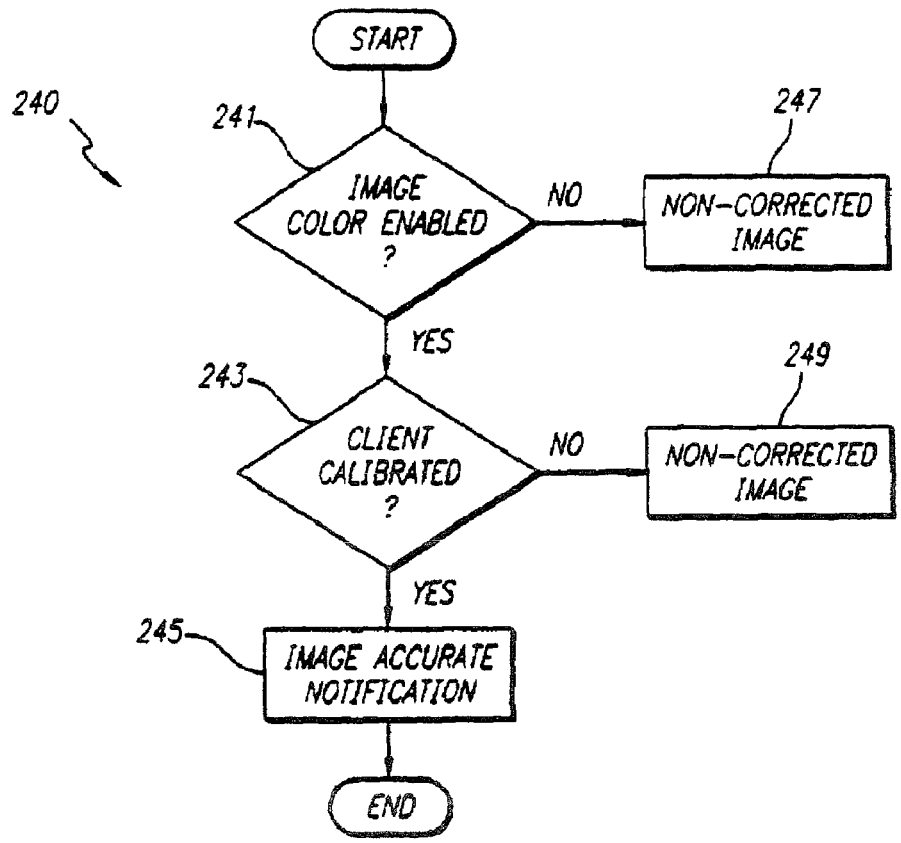
FIG. 5A is a flow chart of the process of the present invention.

Referring to FIGS. 5A and 5B, a flowchart of process 240 for implementing the present invention through a sample network 242 is illustrated. For example, using Internet protocols, the present invention is typically enabled when browser 244 begins to reassemble web page 246 on display 248, following the hidden HTML codes or other suitable protocols in web page 246 to determine where to place one or more elements such as element 252 which may be text, images, graphics or videos onscreen. In particular, algorithm 256 may be implemented when browser 244 begins to assemble element 252 or other part of a requested page. One skilled in the art, however, will recognize that implementation of the present invention can be initiated at anytime a page element requiring accurate color or gray scale including a graphic, image or video is present. Color or gray scale accuracy is identified here as high fidelity or identical rendition of a page element as compared to the image of the page element as viewed on the authoring display, or as an absolute within a color space.

The technique according to the present invention initially determines whether the image has been color enabled as shown at step 241 and subsequently whether a user such as client 250 has been color characterized or corrected as shown at step 243. To detect whether an image is color enabled according to the present invention, an algorithm such as algorithm 256 may detect whether color correction information such as color specific files 258 or registry entries 260 are associated with a page element such as element 252. Color correction information may also include: (1) user specific Hypertext Markup Language (HTML) tags within the web page that designate the color properties of the source image such as tags 262, other markup languages such as XML, XSL, XGML or DHTML may also be used, (2) a color profile 264 which may be a standard profile such as ICC, color sync, SRGS or SRGB64 embedded within the image file itself and (3) pointers to user specific (i.e. HTML) or standard (i.e. ICC profiles) color files associated with the image file such as color specific files 258. At step 245, algorithm 256 may determine whether network 242 is acting in accordance with steps 241 and 243 above to provide a faithful rendition of element 252.

Upon determining whether the image is color enabled at step 241 and whether client 250 has been color characterized at step 243, notification element 254 may be provided as an indication of the status or fidelity of element 252 currently being viewed by the client. In particular, at step 245 when an image such as element 252 is color enabled and corrected, notification may be provided to a client such as client 250 that the color of the image is accurate. If the image is not color enabled, at step 247 notification may be provided to the client that the color of the image may not be accurate. If the client is not color characterized or calibrated, at step 249 notification may be provided to the client that the color of the image may not be accurate. Notification steps 247 and 249 may result in the same indication to client 250 or distinct notifications may be used. Alternatively, notification may be provided to another server, network administrator or other interested device. After notification of client 250 at either steps 245, 247 or 249, algorithm 256 may enter a standby mode until another web page with image elements is detected. Notification element 254 may be a part of web page 246 delivered from a network server or notification element 254 may be generated on device 259 for display on display 248.

Notification may include many variations, one or more icons may be used as well as variations of the image in question. Different cursors may be used to provide notification as well as changes to the users interface characteristics "skins". Notifications may be provided in a conventional Windows icon tray, or adjacent the image, on the image or elsewhere on the display.

In a currently preferred embodiment of the present invention algorithm 256 may detect whether a web page such as web page 246 includes predetermined HTML tags such as tags 262. For example, when a web page with an image is color enabled, the HTML tags direct a browser to display a predetermined text as a headline of a certain size, such as the title "True Internet Color™".

Referring now to FIGS. 6A and 6E, a screen view of a web page 266 having a title "True Internet Color™" (True Internet Color™ is a trademark of E-color Inc.) in title bar 264 and HTML file 270 that created it are shown. The presence of indicator 268 such as "True Internet Color" in a tag such as tags 262 may enable algorithm 256 to recognize that images on page 266 are color enabled. Thus when a web page includes the title "True Internet Color™" the image is considered to be color enabled. The present invention is not limited to recognition of HTML tags directed at the title "True Internet Color™" but rather, indicator 268 may use any predetermined tag configuration such as HTML tag, or web image tag configuration.

| | |
|---|---|
| <html> | Marks the beginning of an HTML-coded file |
| <head> | Marks the start of the header section and may contain descriptive information not displayed onscreen such as the title and author. It may also holds formatting information, such as style sheets. |
| <title>Shop-o-rama True Internet Color(r)</title> | Sets the web page's title, displayed in the blue bar atop the screen. This also affects the displaying window's externally viewable and/or detectable attributes. |
| </head> | Marks the end of the header section and may contain descriptive information not displayed onscreen such as the title and author. It may also holds formatting information, such as style sheets. |
| </html> | Marks the end of an HTML-coded file |

To determine whether an image such as page element 252 is color enabled via ICC color correction information, a system according to the present invention such may detect whether ICC profiles (for the device characteristics of the reference image as represented on the reference device) are embedded within an image file, such as element 252, based upon an ICC profile format specification. In particular, the present invention may detect data 253 stored in ICC profiles such as profiles 255, which are described in the ICC profile specification. ICC profiles such as profiles 255 are device profiles that can be used in pairs to translate color data created on one device such as device 257 into a native color space C of another device such as device 259. More specifically, an ICC profile such as profile 261 may be provided for each device such as device 257 and may be used according to the present invention to transform color image data such as element 252 from a device-dependent color space to the profile connection space, and to transform color image data from the profile connection space to another device-dependent color space. ICC profiles such as profiles 255 for the device characteristics of the reference image as represented on the reference device may be embedded in the image file such as element 252 or stored in a memory in a Connected computer such as device 259. For example, the ICC profiles could be stored in a memory, accessible by a CPU, and associated with the image instead of embedded. Additionally, it should be noted that ICC profile can be accessed by the client from a variety of other sources such as network interface or from other external devices via a modem interface.

To determine whether an image is color enabled-even without an embedded or associated color profile a system according to the present invention may detect whether the image is in a known color space, such as sRGB. sRGB is a well-defined color space, includes various versions such as sRGB 64, and is further defined at http://www.srgb.com. One skilled in the art will recognize that implementation of the present invention may be used with any kinds of images, including but not limited to those subject to compression techniques, such as GIF, PNG or JPEG formatted images.

Referring to step 243, the present invention interrogates the client system to determine if that system is characterized and calibrated to the same state, or to a different but known state. In other words, the present invention detects the presence of a transfer function in the client system, i.e. in the hardware or software (or the combination of hardware/software and human perception). In particular, the present invention checks file entries and registries, or pointers to such entries and registries, to determine whether characterization parameters are present. A flag, initialized to a set value, signals whether the client system has been characterized. For example, in a typical embodiment, a binary flag initialized to a zero value is set to a non-zero value when the present invention detects the client system is characterized. In accordance with the present invention, a client may use any type of conventional or newly developed color calibration system including, for example, the interactive color calibration method disclosed in U.S. Pat. No. 5,638,117.

Referring to step 16, the present invention then determines the whether the system is acting in accordance with steps 12 and 14 above to provide color accuracy. In particular, once the present invention confirms that the presence of color correction information in the displayed image (step 12) and the image has been adjusted, as needed, to display properly on the calibrated or characterized client system (step 14) (i.e. color accuracy is being provided for in step 16), a notification is displayed to the user (step 18). When the software process determines that color accurate display is occurring on all or part of the image, then an appropriate notification is made to inform the user that color correction has occurred where marked. One skilled in the art will recognize that the particular type of notification is not critical to the invention. The notification may be visual or non-visual notification (e.g. audio). For example, the visual notification may be an icon that provides users with a visible indication about the integrity of color imagery currently being viewed by the client at a specific web site. It does this by briefly flashing the cursor for a fraction of a second to indicate if whether or not the page is being viewed utilizing color correction. This icon can be implemented in addition, or instead, in the OS, in a web-enabled application, or in a browser (when implemented on as a client-side application); or it can be implemented as an image, tag, program, or watermark embedded within a web page by the web server or by any of the links between server and client within the network infrastructure.

For example, when a user requests a Web page from a web site enabled by the present invention, the HTML is sent to the client directly from the web site's main servers. A specially attached URL link calls up color-corrected images from the hosted server, and the client's browsers integrate the two pieces automatically. Thus, in accordance with the present invention, the notification not only provides notification feedback to the user, but also reinforces a message of data fidelity to the end-user in determining whether the color data is accurate or not. The present invention has applicability for any client viewing or display application where color accuracy is important to the communication of information. Examples include, but are not limited to, viewing artwork, fashion, cosmetic, logo or brand colors, paint, photography and other color-sensitive information over a medium such as the Internet where content viewer and content creator are disconnected by physical space and/or time. Although, for illustrative purposes, the present invention is described and illustrated utilizing web pages hosted on a server and displayed with color correction on a client, the invention is not limited to such a configuration. Rather, the present invention would apply equally well to images displayed on any imaging peripheral including transmissive, reflective, and other source and/or client imaging technologies. Moreover, the present invention would also apply to images not viewed by the Internet, such as images within computer applications, TV, broadcast, or other client output media of any kind, including printed output. The present method would apply to both digital images and analog images including both real and synthetic images authored for, and/or viewed on, a client system.

Figure 7:
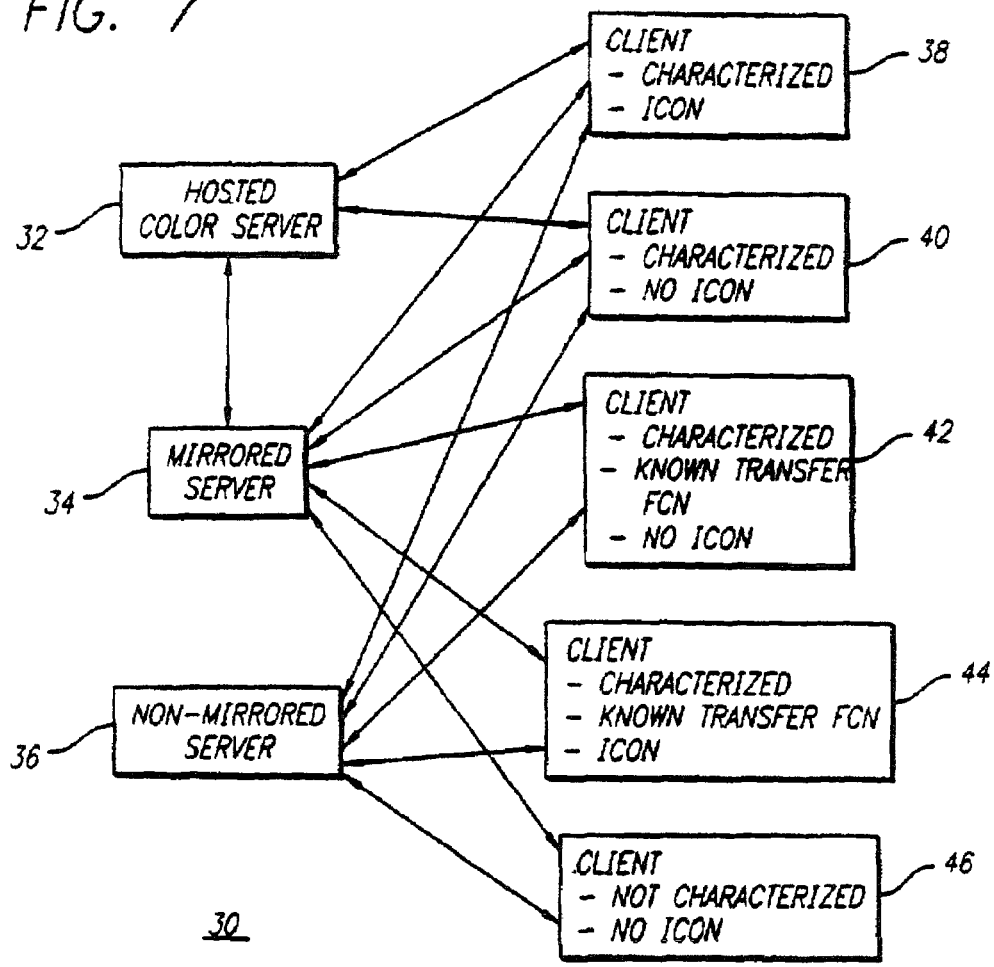
FIG. 7 is a block diagram of the process steps of the present invention.
Figure 8:
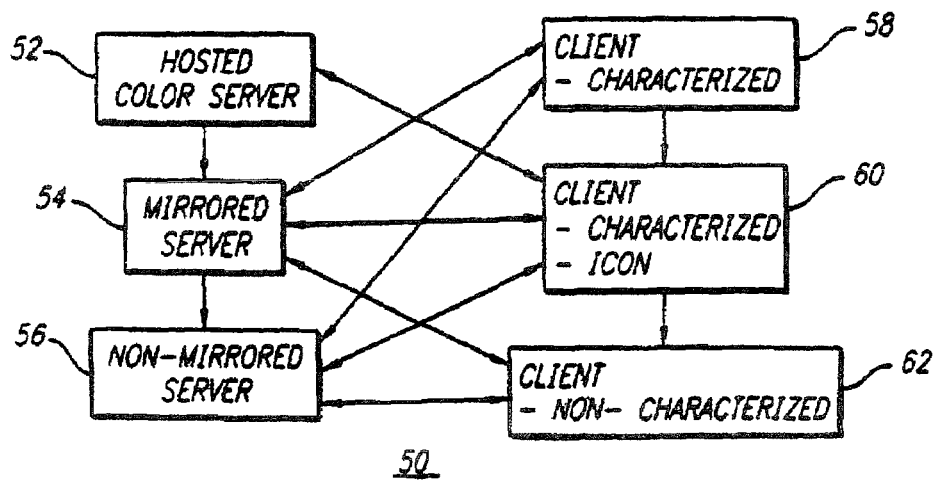
FIG. 8 is a block diagram of the process steps of the present invention.

The present invention may be implemented as a client-based notification system 30 as shown in FIG. 7 or server-based notification system 50 as shown in FIG. 8. With respect to a client-based notification system, the present invention may be installed on a client system such as client 38, peripheral, and/or other output technology that has various states of visual display to notify the user about the state of color correction for digital images output or displayed. Referring to FIG. 7, a functional block diagram of a client-based notification system 30 for providing critical end user feedback as to the color correction status of imagery on a client display is illustrated. Client-based notification system 30 is shown with hosted color server 32, mirrored server 34, non-mirrored server 36 and clients 38, 40, 42, 44 and 46 which represent the various types of clients, that is, clients such as 38 and 40 which include the client based notification techniques of the present invention (indicated by the term "icon"), clients 38, 40, 42 and 44 which are characterized for color, clients 42 and 44 which have a known transfer function and client 46 which is not characterized, has no known color transfer function and does not include a notification system according to the present invention.

Icon 66 depicted in FIG. 9(b), provided by client 38 is preferably initiated to a non-corrected state. When client 38 sends a request to mirrored server 34, which mirrors hosted color server 32, a color corrected requested image is sent from hosted color server 32 to client 38 including a color notification tag, such as a specific HTML title bar flag. The Web page HTML from server 34 includes a color notification tag within its HTML tags to indicate in the title bar that the images to be sent by server 32 have been enabled for color correction. For example, as shown in FIG. 6A, the title bar of the web page may include a notification in its title bar, such as "True Internet Color", in addition to other terms such as the name of a related company, to indicate color correction. As noted above, one skilled in the art will recognize that the present invention is not limited to the detection of predetermined HTML title tags, rather, any device capable of detection may be used as the color notification tag. Upon arrival at the client 38, the present invention detects the color notification tag by evaluating the HTML tags sent from server 34 to determine whether the image delivered from server 32 has been color correction enabled by detecting the True Internet Color tag in the title. It also checks whether client 38 has been color characterized or calibrated to a known state. If both conditions are true, an icon such as icon 66 depicted in FIG. 9(b) is changed to a corrected state as depicted by icon 64 in FIG. 9(a). In contrast, when client 38 sends a request to a site providing non color corrected pages, such as non-mirrored server 36, which is does not include the special HTML tags, such as "True Internet Color" to indicate color correction, then icon 66 remains unchanged from its non-corrected default state.

Still referring to FIG. 7, local client 40 is characterized but includes no applet incorporating the present invention for notification as indicated by the phrase "no-icon". Local client 40 is in direct communication with mirrored server 34 and hosted color server 32. Local client 40 provides no notification icon. When local client 40 sends a request to mirrored server 34, the requested image is color corrected and sent back by hosted color server 32, with no notification icon on client 40. When local client 40 communicates with non-mirrored server 36, the requested image is not color corrected, and there is no notification icon to this effect.

Client 42 is characterized and includes a known (characterized or calibrated) transfer function but no applet incorporating the present invention for notification. Client 42 is in direct communication with mirrored server 34 and non-mirrored server 36 and in direct communication with hosted color server 32 via redirection requests from mirrored server 34. Client 42 provides no notification icon. When client 42 sends a request to mirrored server 34, the requested image is corrected. However, no notification indicating color correction is sent back to client 42. When client 42 sends a request to non-mirrored server 36, the requested image is not color corrected and no notification of color correction is sent back to client 42. In such case, the title bar of the web page would not indicate a color corrected image.

Client 44 is characterized and includes a known (characterized or calibrated) transfer function and includes an applet incorporating the present invention for notification. Client 44 is in direct communication with mirrored server 34 and non-mirrored server 36 and in direct communication with hosted color server 32 via redirection requests from mirrored server 34. Client 44 provides a notification icon. When client 44 sends a request to mirrored server 34, the requested image sent by hosted color server 32 is color corrected. In such case, the title bar of the web page would indicate a color corrected image. Notification indicating color correction is sent back to client 44 indicating a color corrected image being displayed. When client 44 sends a request to non-mirrored server 36, the requested image is not corrected and no notification of color correction is sent back to client 44. In such case, the title bar of the web page would not indicate a color corrected image.

Client 46 is neither characterized nor includes an application incorporating the present invention for notification. Client interacts with non-mirrored server 36 only and provides no notification icon. When client 46 sends a request to non-mirrored server 36, which is not in mirror communication with hosted color server 32, the requested image sent by non-mirrored server 36 is not color corrected and no notification is provided to the client 46. In such case, the title bar of the web page would not indicate a color corrected image.

Referring now to FIG. 8, a functional block diagram of a server-based notification system 50 for providing critical end user feedback as to the color correction status of imagery on a client display is illustrated. With respect to a server-based notification system, the present invention may be installed on a web site server to notify the user about the state of color correction for digital images output or displayed. In particular, the icon of the present invention can be implemented in an image, tag, program, or watermark embedded within a web page by the web server or any of the links between server and client within the network infrastructure. Server-based notification system 50 is shown with hosted color server 52, mirrored server 54, non-mirrored server 56 and clients 58, 60, 62 and 64. The icon of the present invention is installed in hosted color server 52 and mirrored server 54 and not in non-mirrored server 56.

When client 58 sends a request to hosted 52, client 58 may communicate through some means that it is a client that is of a specific, known calibration. This notification may be included in the HTML stream sent by the browser, or via any other method. In that case, if a color corrected image is sent from hosted color server 52 (or from mirrored server 54) to client 58, then an icon is also sent by mirrored server 54 or by hosted color server 52 to indicate that the image has been corrected. In contrast, when client 58 sends a request to non-mirrored server 56, which is not in communication with hosted color server 52, non-mirrored server 56 does not include an icon (or sends an icon indicating that no color correction has occurred).

In accordance with an alternative embodiment of the invention, client 60 is characterized and includes an applet incorporating the present invention for providing notification. Local client 60 is in direct communication with mirrored server 54 or hosted color server 52, which also includes the notification icon. When client 60 sends a request to mirrored server 54 or hosted color server 52 as described above, the requested image is color corrected and sent back by web site server along with a notification icon indicating a corrected state. Mirrored server 54 also sends the HTML tags indicating color correction and the icon on client is changed to indicate the corrected state. Logic is implemented to arbitrate between the state of the two icons (server-based and client-based). For example, in one embodiment either the server or client based notification icon may take precedence while in another embodiment a third icon, similar to the icons shown in FIGS. 5(*a*) and (*b*), may be used to indicate the presence of a different level of color correction based on the presence of both server and client based notifications.

Client 62 is neither characterized nor includes an application incorporating the present invention for notification. When client 62 sends a request to server 54, then either server 52 would use HTML tags to add some watermark or other image to the web page to indicate color accuracy; or server 52 would request web server 54 to send an image which already has an icon superimposed on the image sent by server 54. When client 62 sends a request to non-mirrored server 56, the requested image sent by non-mirrored server 56 is not color corrected and no notification is provided to client 62. In such case, the title bar of the web page would not indicate a color corrected image, and no icon would be sent by non-mirrored server 56.

In accordance with an alternative embodiment of the present invention, depending upon the relationship between the mirrored server 54 and hosted color server 52, hosted color server 52 may require mirrored server 54 to identify images not color corrected. In such case, a server-based icon can be sent to a client to indicate images which are not color corrected.

In accordance with another alternative embodiment of the present invention, multilevel icon certifications may be provided. In particular, multilevel icon certifications can be utilized to distinguish between icon certifications between various entities providing for color correction. For example, when hosted color server 52 provides color correction, an icon identifying not only color correction, but correction specifically provided by a particular hosted color server, is sent to the client. On the other hand, if color correction is provided by another entity, an icon identifying color correction, without identification of a specific entity providing for correction, is sent to the client.

Partial File Processing

To increase the speed of providing color corrected images to a user, commercial server 18 of FIG. 1 may store partially preprocessed data files such as image files or may partially preprocess data files on-the-fly. Similarly, only that portion of a compressed image file necessary to correct the color need be decompressed for color correction thus expediting the process. In general, images available on network 200 may conform to one or more compression standards to permit greater throughput of information and higher inter-connectivity. Several standard image formats such as JPEG (joint Photographic Experts Group), or MPEG (Motion Picture Experts Group), or GIF (graphical interchange file format) may be found on a network such as the Internet.

Referring now to FIG. 10 process 300 is a conventional technique for image compression such as, for example, a JPEG format. Image 302 may be any image such as a line drawing, a black and white or color photograph, or any other image. Image 302 is compressed by compression device 304 according to a compression standard, here JPEG standards, and results in JPEG file 306. A compressed file such as a JPEG file 306 may have several identifiable elements, such as luminance element 308, color element 310, and miscellaneous elements 312 and 314. Miscellaneous elements such as element 312 may include information unnecessary for the ultimate display of a color corrected images over a network, such as a thumbnail image. Other compression standards may have different elements and may function similarly for color spaces using different specification characteristics.

A compressed image file such as image file 316 may be partially uncompressed to expedite color correction as shown in FIG. 10. At step 317, file filter 318 processes image file 316 to separate compressed luminance elements and compressed color elements such as compressed luminance element 316L and compressed color element 316C respectively. Unnecessary file elements such as miscellaneous elements 312 and 314 of FIG. 10 may be discarded to expedite processing. Compressed color element 316C is passed along at step 319, as no processing of compressed color element 316C is required according to a currently preferred embodiment of the present invention. However, use of other color spaces or compression techniques may require some processing of a generally unused element such as compressed color element 316C and may result in processed elements such as element 322.

At step 321 one or more file elements needing correction such as luminance element 316L may be decompressed to form correctable elements such as correctable element 320. Following step 321 alternate paths may be used.

In a first embodiment of the present invention at step 325, correctable element 320 and element 322 may be combined using data combiner 324 to form intermediate file 326. Intermediate file 326 has shared elements with compressed image file 316. Correctable elements such as correctable element 320 may be uncompressed awaiting correction and elements not requiring processing such as element 322 may be combined in one or more uncorrected intermediate format files such as uncorrected intermediate file 326. Upon receipt of user color data such as display calibration or characterization data 38 of FIG. 1, uncorrected intermediate file 326 may be processed at step 323 to correct correctable elements such as correctable element 320 according to display calibration or characterization data 38 which may be for a specific user only or it may be a net correction file as discussed below. The result of step 323 may be a corrected intermediate file such as corrected intermediate file 328.

At step 327 corrected elements of corrected intermediate file 328 may be compressed according to the compression technique being used. The resulting file composite corrected image file 332 is a luminance corrected image file according to the compression technique being used.

Referring again to FIG. 1, correction of image file 52F for display may include two or more alternate methods. In a first, display calibration or characterization data 18D of the authoring display 18M may be included with or applied to an image file creating a master corrected image file such as file 237 or uncorrected intermediate file 326 of FIG. 10. Upon receipt of user display calibration or characterization data 238 final correction of image file 237 may be accomplished. Thus file 237 may be displayed on display 206 with corrections included for display 208 and display 206. Alternatively, author display calibration or characterization data 236 may be combined with user display calibration or characterization data 238 to create a net correction file 239 that may be applied to any images authored on display 208 to achieve accurate image display.

In a second embodiment of the present invention at step 325, correctable element 320 may be corrected to form corrected element file 330. As discussed above, upon receipt of user color data such as display calibration or characterization data 38 of FIG. 1, correctable element 320 may be processed at step 323 according to display calibration or characterization data 38 which may be for the user only or it may be a net correction file as discussed.

At step 327 corrected elements such as corrected element file 330 may be compressed according to the compression technique being used. Compressed corrected element file 334 may be combined with element 322 in combiner 336 to form composite corrected image file 338. composite corrected image file 332 and composite corrected image file 338 should yield identical images when displayed on display 22 of FIG. 1.

Starting from an original image file, this technique may also be applied by originally compressing a portion of the image file. The uncompressed portion and the compressed portion and the authoring station color characterization data may then be combined into an intermediate file format to permit fast correction and complete compression for transfer to a user.

Image Preprocessing Sets

In another aspect, the present invention includes a technique for organizing display devices into subsets according to their characteristics and thus limit image correction to a finite number of perceptually uniform subsets. An image presented on display devices within a subset should be indistinguishable to a user on all devices having characteristics within the subset. Analysis of the relationship between gamma, black-point and luminance for display devices such as monitor 353 and monitor 361 demonstrated that within a gamma black-point plane such as coordinate system 364 of FIG. 12, subset areas having limited variance luminance may be described.

Figure 11:
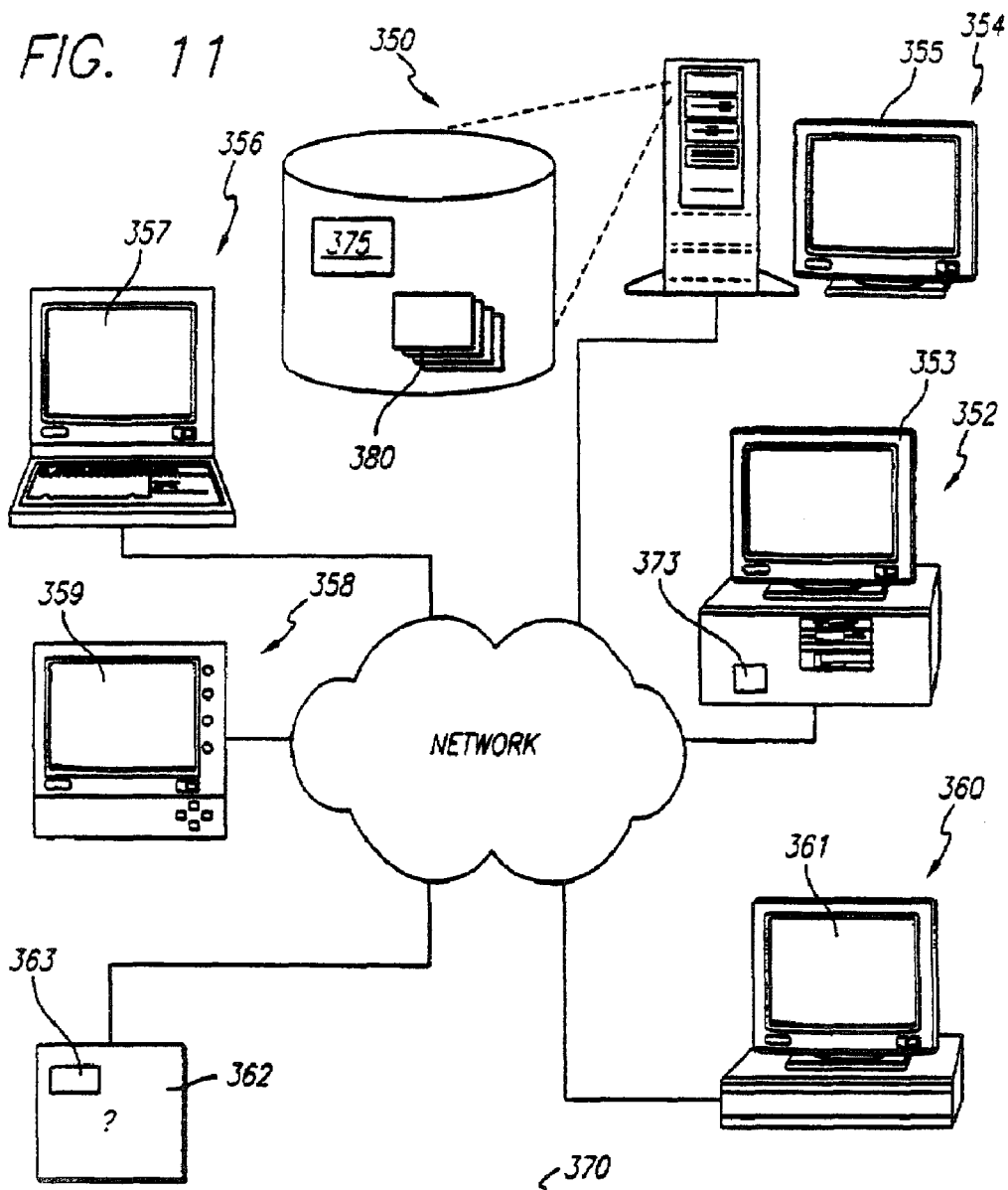
FIG. 11 is a block diagram of an alternate network according to the present invention.

Referring now to FIG. 11, in a currently preferred embodiment of the present invention network 350 includes two or more electronic devices such as devices 352, 354, 356, 358, 360 and 362. Electronic devices 352, 354, 356, 358 and 360 further include display elements such as monitor 353, monitor 355, display 357, display 359, monitor 361 and display device 363 respectively. Display elements such as monitor 353, monitor 355, display 357, display 359, monitor 361 and display device 363 may be characterized using two or more parameters such as gamma black-point and luminance for CRT displays. Non-CRT display devices may use different parameters.

Figure 12:
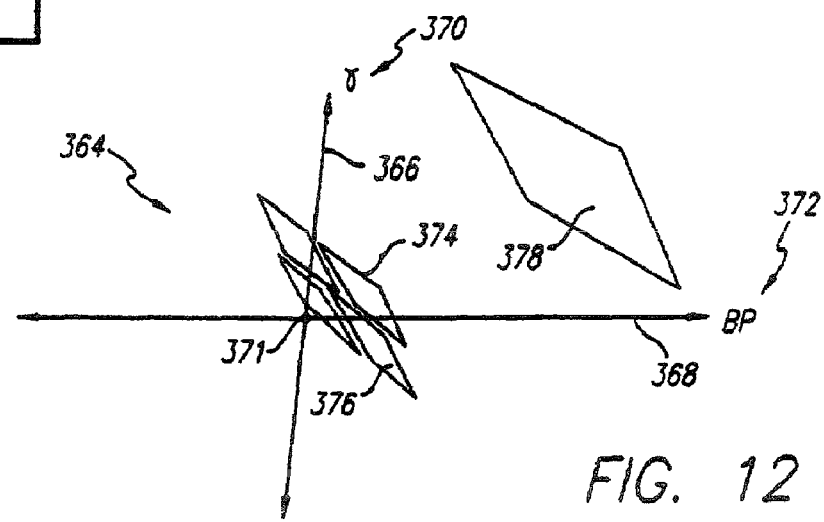
FIG. 12 is graph of a parameter space according to the present invention.

Referring now to FIG. 12 coordinate system 364 includes characteristic axes 366 and 368 illustrating the interrelationship between characteristic 370 and 372 respectively. For conventional cathode ray tubes displays such as monitor 353 coordinate system 364 has two characteristic axes 366 and 368 for characteristic 370 (gamma) and 372 (black point) respectively.

One or more subset areas such as subset 374 may be used to identify areas of luminance having nearly-indistinguishable image parameters for CRT display devices such as monitor 361 and display device 363. Subset areas such as subset 374 and subset 376 may overlap. In a currently preferred embodiment of the present invention, subset overlapping is required to completely cover the characteristic space describing the imaging or display device. As characteristic 370 (gamma) and 372 (black point) move away from origin 371, subset areas such as subset 378 may include larger or smaller areas than subset areas closer to origin 371 such as subset 374.

Display device parameters 370 ($\gamma$) and 372 (black point) may be obtained from display device characterization as discussed above. Thus, when a user device 352 requests an image from a correction enabled server 354, server 354 may display parameters such as characteristic 370 (gamma) and 372 (black point) from user display calibration or characterization data 373 and may provide a pre-corrected image such as pre-corrected image 375 according to which subset 374 the users display device may be grouped in. A server so enabled may store a finite number of pre-corrected images such as pre-corrected images 380 to expedite fulfilling a user request for a corrected image according to the subset of the users display device.

Figure 13:
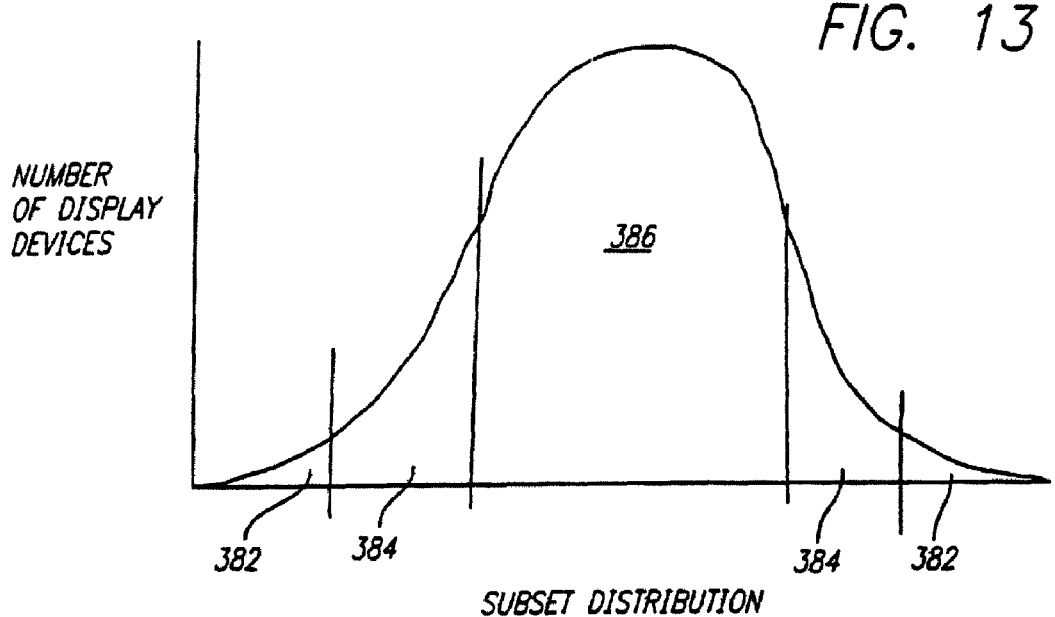
FIG. 13 is a parameter distribution curve according to the present invention.

Referring now to FIG. 13, in an alternate embodiment of the present invention, a correction enabled server such as device 354 may use a combination of pre-corrected images in local storage to provide to display devices having subsets in area 386, pre-corrected images in central or network storage for the smaller yet significant number of display devices having subsets in areas 384 and on-the-fly image correction display devices having subsets in areas 382. Other combinations of image correction and storage may be used. Distribution area 386 may also be characterized in terms of one or more parameters of display 353, input or output device, or in terms of some other important and useful characteristic used to subset display devices or images. The distributions need not be limited to a unidimensional characteristic, they may be multidimensional and encompass many display or imaging parameters.

In another embodiment of the present invention, information from characterization data block 34 necessary to assign a user to a subset 374 may be encoded into an image request such as image request 54 by being encoded in a URL or other request parameter. By encoding characterization data and by extension subset information onto the URL of a corrected image, the image may be cached.

Determining Input/Output Parameters of Any Display

Figure 14:
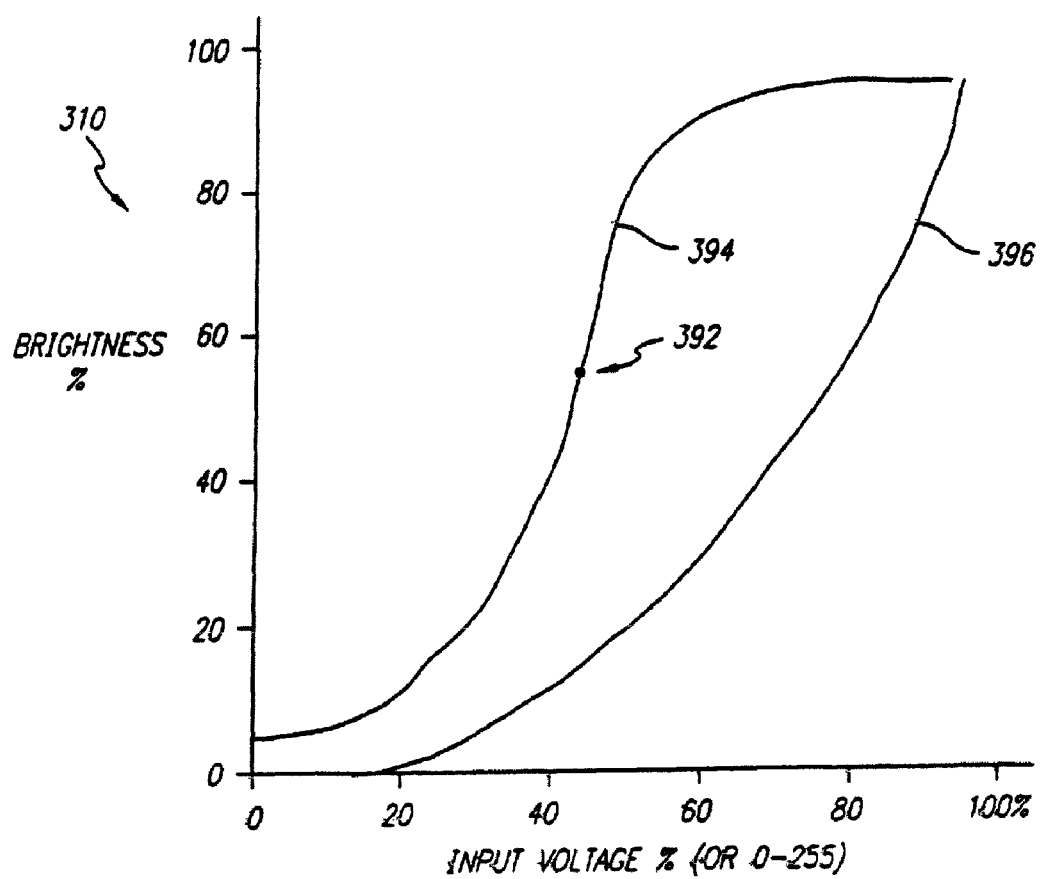
FIG. 14 is a graph of display transfer functions according to the present invention.

Referring now to FIG. 14, in another aspect, the present invention includes a method and apparatus to establish the input/output characteristics (I/O) and operating point such as point 392, and to determine I/O curves of displays such as I/O curves 394 and 396, that may be applicable to any type of display technology such as display 357 of FIG. 11. It can be used in conjunction with visual or instrumental characterization or calibration methods. The method described in this invention is not limited to any particular display technology, but it will be described using Liquid Crystal Display (LCD) technology as an example. An application according to the present invention may run in conjunction with any type of display.

Figure 15:
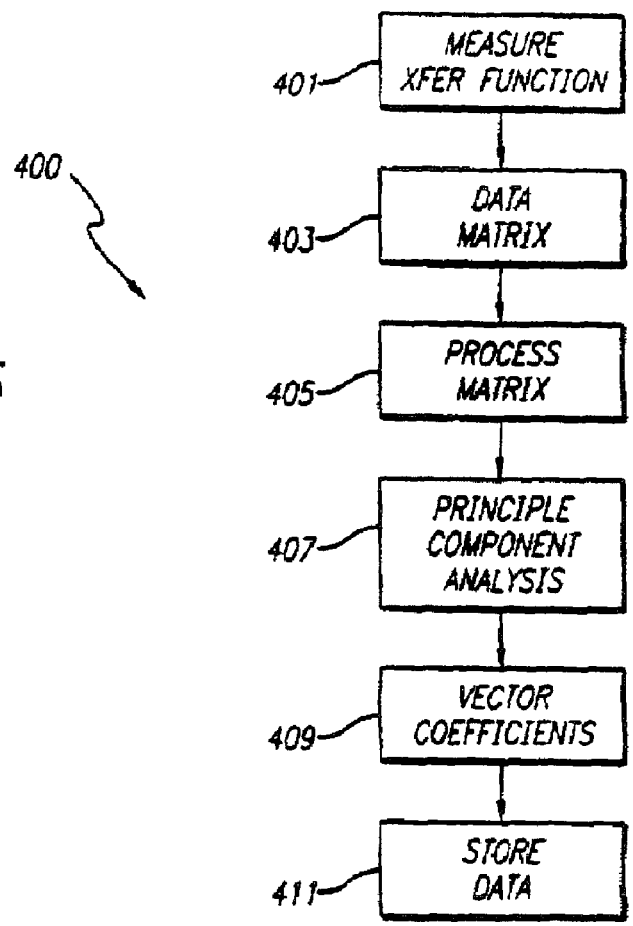
FIG. 15 is a block diagram of a first alternate process according to the present invention.
Figure 16:
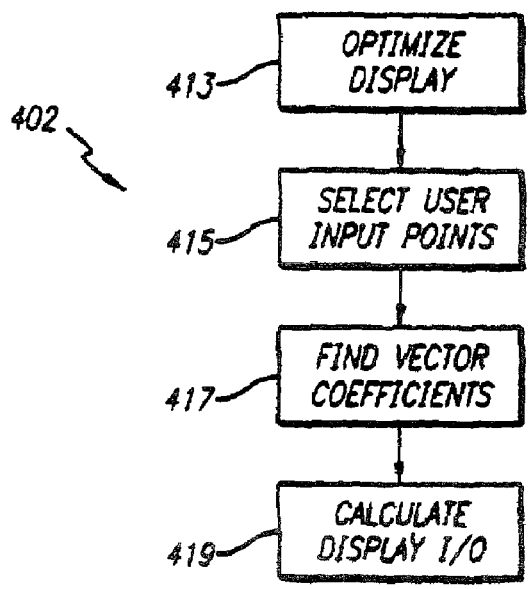
FIG. 16 is a block diagram of a second alternate process according to the present invention.

Referring now to FIGS. 15 and 16, an operating point determination method according to the present invention includes two parts. The first part, data reduction 400, determines the appropriate subset of orthogonal basis vectors that describe the space of measured I/O curves such as I/O curve 394 along with the coefficients used to synthesize the curves. In principle data reduction 400 need only be done once providing the curves used in the analysis span the space of all possible I/O curves. It is this property that makes this a robust general method. In practice, data reduction 400 characterizes a large set of display I/O curves, or vectors, using a smaller set of orthogonal basis vectors. If each I/O curve is represented by N input points, then there is a possibility that the space containing all measurable I/O curves is N-dimensional. Rarely is an I/O characteristic N-dimensional, usually the dimension is something less than N.

The second part of an operating point determination method according to the present invention, data application 402, describes the determination of a specific I/O curve such as I/O curve 394 for a users display such as display 357. There are no constraints, both visual and instrumental approaches are possible.

Data Reduction

Figure 17:
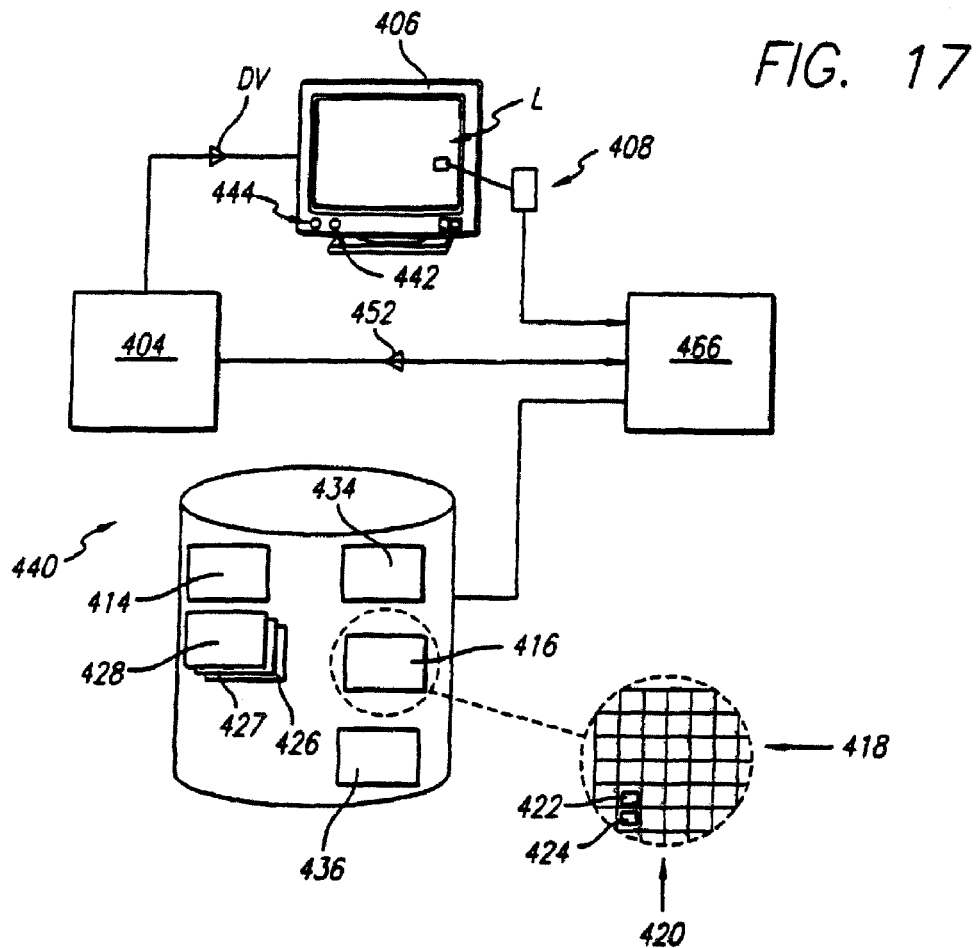
FIG. 17 is a detailed block diagram of a network according to the present invention.

Referring now specifically to FIGS. 15 and 17, at step 401 data reduction according to the present invention tests displays such as display 406 and measures screen luminance L, also called screen brightness, as a function of known digital input values DV for neutral or near-neutral colors. Luminance versus digital input value data may also be compiled from existing data such as manufacturers data where available. A plot such as graph 412 of measured luminance L, in candelas/m², versus DV yields a measured I/O transfer function such as I/O curve 410 of FIG. 18. Screen luminance may be determined using light measuring device 408 which may be a spectroradiometer, calorimeter, or other form of light measuring device. Such measurement could also be done on a relative basis by comparing the displayed luminance relative to some reference, such as a "gray scale" or series of know areas of reflectance. For I/O curves of specific display color primaries, each primary color would be displayed instead of the neutral color. Display color primaries may be red, green and blue for a conventional RGB system, other systems may be used such as CMY, YUV or any other suitable combination.

The number of input DV to be sampled should be sufficient to sample any curvature of the I/O curves such as I/O curve 410. In a currently preferred embodiment of the present invention fifteen uniformly spaced input DV levels have been used, but specific display devices might dictate more or fewer levels. The actual number will depend on the instantaneous slope such as slope S of I/O curve 410. A higher slope such as $S_1$ suggests more samples be used to adequately measure the curve, and, with a lower slope such as $S_2$, fewer samples may be used.

A sufficient number of different display devices that span the range of I/O characteristics of interest need to be measured or formulated from useful models. The measured data can be one device such as display 406 measured at a multiplicity of display control settings, e.g. brightness and contrast, or many different displays such as monitor 353, monitor 355, display 357, display 359, monitor 361 and display device 363, other combinations are possible.

At step 403 data 414 may be tabulated in a matrix format such as matrix 416 where rows such as row 418 may correspond to each display such as display 406 and/or display setting, and columns such as column 420 may correspond to input data Dv. Matrix entries such as entry 422 may be normalized luminance values such as output luminance L. Data matrix 416 may also be "inverted", resulting in columns such as column 420 representing the interpolated luminance values and the matrix entries such as entry 422 are the input digital values. Consistent with the spirit of the invention other normalization techniques may be used. In a currently preferred embodiment of the present invention fifteen input DV values and twenty one different display conditions are used yielding a 21 by 15 matrix.

Step 403 may also include data processing to include normalized display luminance versus normalized DV for each display and/or display setting. Input data DV and output data L may be normalized by dividing by the maximum value in each case. This normalization yields a range of zero to 1.0 for both input and output values.

Matrix 416 must be processed at step 405 before PCA. First, column average 424 of each column 420 of data matrix 416 is determined. The column average is subtracted from each row 418 of data matrix 416. This new matrix is called reduced matrix 426. A covariance matrix 428 is computed by pre-multiplying reduced matrix 426 by its transpose, transpose matrix 427. PCA is then performed on transpose matrix 427. Any suitable conventional software programs may be used to carry out the computations.

At step 407, Principle Component Analysis (PCA) may be performed, (a.k.a. eigenvectors, characteristic vectors) on data matrix 416. The basic idea of PCA is to represent the large collection of measured I/O curves or vectors, by a smaller set of orthogonal basis vectors. A weighted linear combination of these basis vectors are then used to synthesize the complete set of I/O vectors.

In a currently preferred embodiment of the present invention after PCA at step 407, three vectors $v_1$, $v_2$ and $v_3$, plus a mean vector $v_m$, accounted for about 99.88% of the variance in the different I/O curve shapes. This signifies that mean vector $v_m$ plus some weighted linear combination of basis vectors $v_1$, $v_2$ and $v_3$, may be used to synthesize each of the twenty one I/O curves used to generate the data quite accurately. In practice, the number of vectors can be more or less than three, depending on the variety of the measured or model curve shapes (the vector subspace) used in the analysis, and, the precision of the fit required.

Mathematically, I/O curve, Lj, at input, j, may be written as the linear combination of the average vector and the three basis vectors as shown in equation 430.

$$L_j = \bar{v}_j + a_1 v_{1,j} + a_2 v_{2,j} + a_3 v_{3,j} \qquad 430$$

In equation 430 $a_1$, $a_2$ and $a_3$ are the vector weights and $v_1$, $v_2$ and $v_3$ are the first three basis, or characteristic, vectors determined from PCA in step 407. Since mean vector $v_m$ and the three basis vectors $v_1$, $v_2$ and $v_3$, are fixed, only three scalar values $a_1$, $a_2$ and $a_3$ are needed to describe the complete I/O curve such as I/O curve 410. This is a significant compaction of the data needed to describe the I/O curve. Without this representation it would take at least fifteen values, in our case, to describe each curve.

At step 409 three coefficients $a_1$, $a_2$ and $a_3$ in equation 430 are determined. Coefficients $a_1$, $a_2$ and $a_3$ are not necessarily related to any specific point on the I/O curve depending on original data matrix 416. If data 414 were input digital values then there may be some simple relationship between coefficients, $a_1$, $a_2$ and $a_3$ and some point on curve 410. For a practical application coefficients $a_1$, $a_2$ and $a_3$ need to be "mapped" or connected to some measurable points on the I/O curve. These points can be determined using visual methods or instrumental methods.

For example, coefficients $a_1$, $a_2$ and $a_3$ may be determined as follows. For each of twenty one I/O curves initially measured or gathered, the DV's yielding 25%, 50% and 75% relative screen luminance may be determined by inverse linear interpolation of each I/O curve. That is three DV's for each component channel such as red, green and blue channels in a conventional RGB system. The other data set is the vector coefficients needed to synthesize the curves. Data set 434 now includes three DVs, $DV_{25}$, $DV_{50}$, and $DV_{75}$, and three vector coefficients $a_1$, $a_2$ and $a_3$; for each I/O curve 410 and the task is to relate DV and coefficients.

In another aspect of the present invention, alternative DV sets may be used to more accurately characterize displays. $DV_{25}$, $DV_{50}$, and $DV_{75}$ may be used for CRT displays and $DV_{33}$, $DV_{50}$, and $DV_{66}$ may be used for LCD displays. Other DV sets may be used successfully.

One technique is using polynomial regression to solve for $b_k$ in equation 432.

$$a_k = (b_1 DV_{25} + b_2 DV_{50} + b_3 DV_{75})^2 \qquad 432$$

Other equations may be fitted by either regression or a variety of other curve or function fitting operations. Another possibility is to use some functional form representing a physical model, or, use PCA again. Yet another method might be to linearly or nonlinearly interpolate values, or interpolate $a_k$ from a multidimensional table.

At step 411, data set 434 includes a set of three vectors $v_1$, $v_2$ and $v_3$, plus mean vector $v_m$, and an equation for each coefficient $a_1$, $a_2$ and $a_3$ that relate the DV's determined from the matching by users or by an instrument, to the coefficients, or weights, needed to synthesize or construct the curve. This needs to be done only once and may be put in a database 436 or stored in any other suitable storage system as shown in FIG. 16.

I/O Curve Construction

Once database 436 has been constructed a display I/O curve 410 for each color channel or neutral gray may be created. The I/O curve thus constructed can be written to a file, data set 434, computer memory 438, or otherwise stored for further use in system 440 according to data application method 402 as part of a profile for color management or image management. Image management can comprise any archiving of images or any form of image processing, either spatial or temporal.

Step 413 of data application 402 is to optimize the setup of the display such as display 406. It is possible for users to misadjust the display controls such as brightness control 444 and contrast control 442 so the high luminance levels are on shoulder 446 of I/O curve 410, and many of the low luminance levels are on toe 448 or lower curved part. To optimize operating point 450 of display 406 data for one or more setup screens such as data 452 may be transmitted to user 404 to adjust contrast control 442 and brightness control 444.

Figure 18:
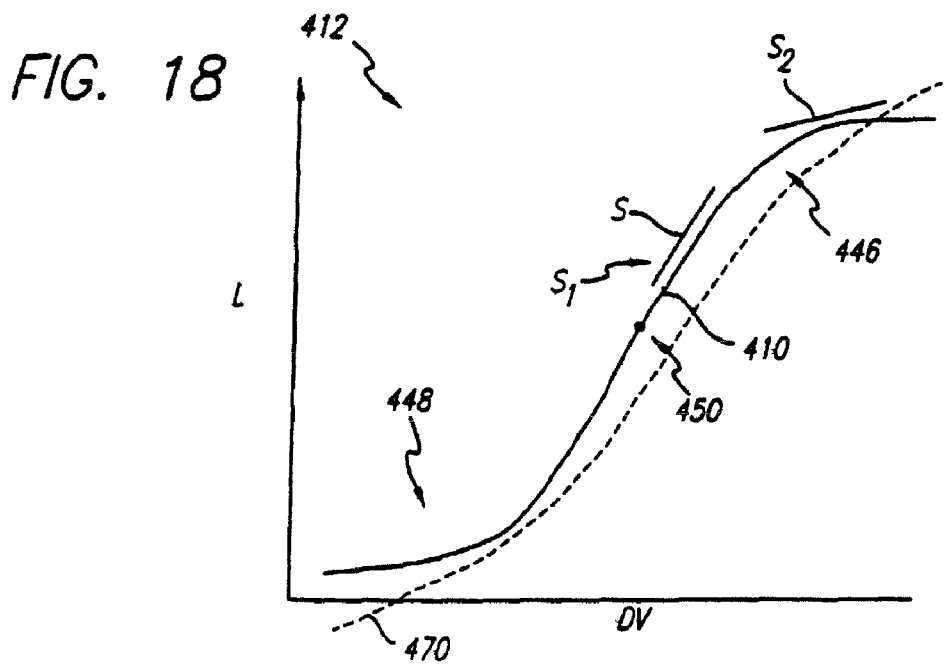
FIG. 18 is a detailed transform curve according to the present invention.
Figure 19:
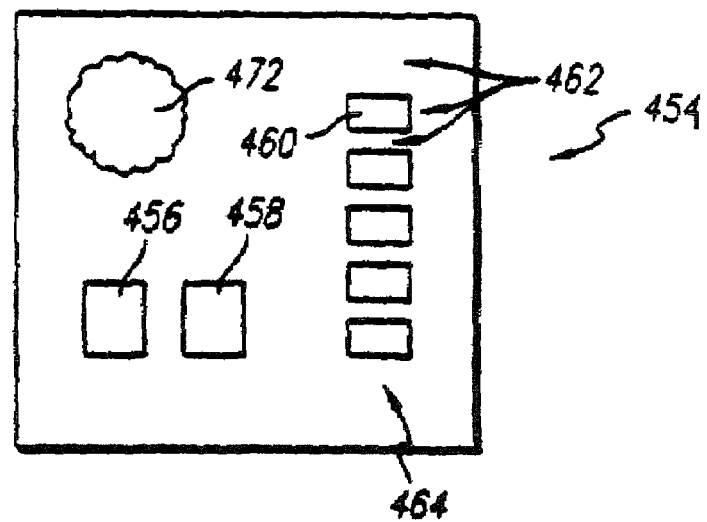
FIG. 19 is a detailed diagram of a display screen according to the present invention.

Referring now to FIG. 18, a setup screen 454 permits user adjustment of display 406 so there is a differentiation of two or more adjacent, or very close, light (brightness) levels at high and low DV. Setup screen 454 may include an array of patches or areas 456 and 458 either of gray or other display primary colors or color mixtures. Areas 456 and 458 may be closely spaced in the highlights and shadow areas of the I/O curve. The user is instructed to adjust the "brightness" and "contrast", or any other display controls, to assure maximum color or luminance difference between the areas. This will help the user to operate the display off shoulder 446 or toe 448 of I/O curve 410 thereby increasing display dynamic range.

For a conventional LCD display, the "brightness" knob generally controls a fluorescent lamp or other light source behind the LCD and the "contrast" knob generally controls the operating point on the LCD. Therefore, the first adjustment should be the "contrast" to prevent the user from operating the display on the shoulder of the curve. This may be counterintuitive because it apparently causes a decrease in the overall screen brightness. However, many LCD displays have a maximum luminance of about 50% greater than a bright CRT. A "bright" CRT may have a luminance of about 100 $cd/m^2$—the sRGB standard is 80 $cd/m^2$—while many of the better quality LCDs have a luminance value of about 150 $cd/m^2$.

Area 456, at 75%, 66%, or any other suitable scale must not impinge onto shoulder 446, and area, 458 at 2.5%, 33% or any other suitable scale for example, must not impinge into toe 448. Achieving an optimum display setting is not critical.

At step 415 user 404 is queried for inputs in order to determine the values for calculating the basis vector coefficients such as $a_1$, $a_2$ and $a_3$. Any combination of three or more points between 0% and 100% may be suitable.

In another embodiment of the present invention, three points from user visual match data may be used to determine coefficients $a_1$, $a_2$ and $a_3$ as shown for example in Eneldrum & Hilliard U.S. Pat. No. 5,638,117. Since there are three vectors in the I/O curve synthesis, at least three points are need to estimate the three coefficients. With more or less number of vectors describing the I/O curves, more or less points may be used. There is not necessarily a one-to-one correspondence between the number of vectors and the number of points used. One possibility is to display three, 25%, 50% and 75% halftone screens for each of the display colors, red, green, and blue with a number of continuous tone areas immersed in the halftone background. This method is not limited to the three standard so-called primary colors red, green and blue. In fact it is possible to construct a display using cyan, magenta and yellow that match commercial printing standards in order to get a better match or other color systems may be used. This approach would work just as well with this display or any display that used one or more colorants or primary colors. Also, the number of points and the percentage values can be changed to increase precision, or accuracy of coefficient determination with any given display such as 33%, 50% and 66% or, black, 33%, 50%, 66% and white. The user may select one of the embedded patches such as patch 460 that matches either in color or luminance (brightness) of the surrounding halftone 462. Since the DV for each displayed patch is known, these match values determine the DVs that match the 25%, 50% and 75% surround halftone screens. It is also possible to use an instrument to make this comparison. Other arrangements of continuous tone and halftone areas are possible. For example it is possible to keep fixed a continuous tone patch such as patch 460 and make an adjustment of the surrounding halftone such as halftone 462 so there is match between the patch and the halftone.

In still another embodiment of the present invention, a series of patches 464, or images, of known relative DV surrounded by a halftone 462 of known fractional area is presented on a screen 454. An observer is asked to select one of the patches that matches the halftone background. This matching process may then be repeated for two or more other surround halftone values yielding at least three DV-relative luminance pairs. Fractional areas of 25%, 50% and 75% are useful but other values may be better in different situations.

In still another embodiment of the present invention a radiation or light measuring device such as light measuring device 408 may be used and display 406 may be controlled by a computer 466 to present all possible light (color) values in an automatic method. Computer 466 may be programmed to perform a search to find a displayed area 458 that is closest in luminance to a reference luminance, say 75% of the maximum luminance. For popular eight bit systems this does not mean that all 256 levels need to be presented. A binary search method would be very rapid, only requiring the display of patches equal to the number of bits of radiant resolution. For an 8 bit display this would required the display of eight areas, at most, to find the closest input value to the 75% reference value. This process can be repeated for as may values or match points as necessary. Other search methods can be used, for example, some form of table lookup.

At step 417 vector coefficients $a_1$, $a_2$ and $a_3$ may be calculated from regression equation 432, or from a lookup-table or tables, using DVs as independent variables, or possibly the relative luminance obtained by making a halftone-patch match. Other forms of database or data calculations may also be used.

At step 419 equation 430 may be used to calculate the display I/O curve such as I/O curve 410 at each input DV point, j. As in the above example, original data set 414 sampled the input (DV) at fifteen points. This is usually not sufficient for specifying a display profile having an 8 bit input having 256 levels. To compute all 256 or more, points of the I/O curve, several possibilities are available. If the basis vectors such as vectors $v_1$, $v_2$ and $v_3$ are smooth functions of the input DV they can be fit by polynomials or other continuous functional forms. Some form of interpolation is also a method that may successfully be applied. Since the basis vectors are fixed, these need to be interpolated only once and can be stored. In the case of the functional form for the basis vector coefficients equation 430 now becomes equation 468 below:

$$L(DV) = \bar{v}(DV) + a_1 f_1(DV) + a_2 f_2(DV) + a_3 f_3(DV) \qquad 468$$

where $f_x(DV)$ may be the polynomials representing the basis vectors $v_1$, $v_2$ and $v_3$ and $0 \leq DV \leq 1$. A polynomial representation, or other functional representation of the mean vector may also be used.

Reconstructed I/O curve 470 may "overshoot" and/or "undershoot" the actual curve 410. This means that the relative luminance exceeds 1.0, or goes negative. The simple fix is to clip I/O curve 470 to 1.0 the first time it exceeds 1.0, and clip to 0 the first time it goes negative. By checking the 8 bit LUT from the middle of the curve toward the "ends", one can readily determine the first "overshoot" and "undershoot" conditions. Other methods are possible, such as locally altering the transition of the I/O curve at the zero and one points.

In the process of determining a visual match a user may select a patch 472 that generates an unrealistic coefficient $a_u$. There are many ways to deal with this, but a simple way is to ignore basis vectors $v_1$, $v_2$ and $v_3$ and just report mean vector $v_m$. Depending on the basis vectors, the mean vector as a default I/O curve may be adequate for most purposes.

Default Image Enhancement Parameters

In another aspect of the present invention, a method is provided to allow image providers to distribute images with enhanced accuracy (e.g. via color correction) to image display systems that have not been characterized or calibrated, or that do not make their characterization or calibration information available to the image providers.

The method entails the use of a database of image display characteristics information for a number of image display systems interconnected to image providers via a network or networks. By analyzing this information, such as through well-known statistical methods, it is possible to calculate or deduce a set of image display characteristics that provide a "best fit" to all of the image display systems in the database. Proceeding on the assumption that the image display systems contained in the database are representative of all image display systems, the set of image display characteristics thus calculated may then be used to adjust images provided to image display systems that do not otherwise have system specific image display information available.

Thus, this aspect of the invention provides a method to define a "default" set of image display characteristics that has universal, or near-universal applicability to all image display systems interconnected via the network(s) to the image providers. Ideally, the database will include a large percentage of all image display systems connected to the network(s). Additionally, any set of calculated default characteristics will likely be more accurate and have wider applicability if the image display systems in the database represent a wide a cross section of all systems and thus render the analysis results more statistically significant.

The database may include such information regarding the image display systems as the input/output characteristics, color rendering capabilities in terms of CIE display chromaticities or other suitable color description, and the spatial rendering properties, such as a flare spread function and the modulation transfer function(s) capturing the spatial reproduction/rendering properties. The database may also include information regarding each image display system's operating system, browser, data rate of the network connection, and other application data/information that may be useful and relevant to altering the quality of the displayed images.

In one preferred embodiment, the database may be organized as a multidimensional parameter space of input/output characteristics. From this database a multidimensional histogram (e.g. a probability density function) may be computed to specify the fraction of the sampled image display system population that exhibits a specific set of parameters.

A number of algorithms may be used to define and calculate the target display (i.e. set of default characteristics) as represented by a point in the parameter space, based on the multidimensional histogram. One such algorithm may be used to compute the point representing the average of all data points contained in the parameter space. Another algorithm may be used to compute the median of the parameter space.

In a preferred embodiment, an algorithm is employed to determine a group of perceptually uniform points in the parameter space, i.e. determine all points in the parameter space representing image display characteristics that appear visually identical, or nearly identical, to the human eye. This group is determined so as to maximize the number of data points contained within it. The target display coordinates, i.e. the set of default characteristics, are represented by the center point of this group. Another preferred algorithm is used to calculate the coordinate point that maximizes the amount of image enhancement for all image display systems connected via the network(s), i.e. all "real world" displays. Yet another preferred algorithm is used to calculate the coordinate point that minimizes the image degradation across all real world displays.

To derive the group of perceptually uniform points, a perceptual distance metric is calculated between each element of the histogram and a specific point in that multidimensional space. In this manner a value can be assigned to this point and the percentage of the perceptually indistinguishable characteristics in the database that are mapped to that point can be calculated. By varying the coordinates of that point an optimum can be found by maximizing this percentage number.

Any perceptual distance metric can be used. A "metric space" is a set where a distance function D is defined by assigning a value to each pair of elements. The function D satisfies two conditions:

it is always positive; and
for all elements (points) a, b, c: $D(a,b)+D(b,c)>=D(a,c)$ (i.e. "triangle inequality")

The term "metric" refers to the distance function where the underlying space is implied from the context.

In the present case the set is the multi-dimensional parameter space that represents a subset of all possible TRCs (tone reproduction curves). This subset is determined by the on-line display characterization process disclosed elsewhere in the specification.

A metric in this space may be determined by a suitable difference function applied to two TRCs as generated from the parameters defined by a point in the space. Before applying such a function, a luminance-to-lightness correction function will typically be applied to the TRCs to account for the sensitivity of the human eye.

In a preferred embodiment, the function selected the maximum of the absolute difference over the total DV (input) range of two TRCs. Another preferred embodiment of the function calculates the square-root of the integrated square of the difference between the two TRCs.

The database of the image display system population characterization information may be developed by requesting users of the systems to perform some tasks or respond to prompts for information, and by collecting their input (clicks, keystrokes, spoken works, or by processing images of the user taken during this characterization period), as described elsewhere in the application. A useful consequence of this aspect of the invention is that the database will typically be continuously updated and will thus reflect the user population at any given instant. Any algorithm selected for analyzing the database and deriving the default set of characteristics may take advantage of this feature of the database. The representation of the target/destination characterization can be performed in real time and thus provide an accurate estimate on a real time basis.

In a further aspect of the invention, the database may be cleaned/altered/modified to remove "old" or outdated characterizations according to the installed base of displays and thus improve the estimate of the target/reference display used for color correction. Thus, users accessing the image providers on the network may be tracked and, if a particular user is not active for a preselected period of time (e.g. one year), the characteristics information regarding the particular user may be removed from the database. In this manner, the default characteristics derived by analyzing the database are less likely to be skewed by outdated information regarding displays that are no longer in actual use. This is important in the context of computer monitors, such as are typically used with personal computers communicating via the Internet, because these monitors have a relatively limited life span and a monitor that was characterized and entered into the database more than five years prior is likely no longer in service. Because new monitors have different characteristics from older monitors, it is important to maintain a database that provides an accurate distribution of the various monitors in current use.

It is understood that this invention can be applied to the many aspects of processing and/or correcting images. Thus, in one embodiment, the database may be used to derive parameters for correcting for the spatial degradation of displays, thus increasing the sharpness of displayed images.

In a further embodiment, a plurality of default characteristics sets may be derived to address particular aspects of the target systems. For instance, two sets of values may be developed for Macintosh target systems and for all other systems, respectively. This aspect of the target system may be obtained without explicit user action, such as the operating system value contained in HTTP header information, or it may be obtained directly from the end user. In the later case, users may be prompted for a reduced or minimal amount of information, including, for example, the type of display (e.g. CRT or LCD), the size of the display, the age of the display, the environment in which the display is used (e.g. bedroom, office, classroom), the operating system software, and the type of hardware controlling the display (e.g. PC/Macintosh computer, type/make of graphics accelerator, etc.).

In this manner, users may be prompted for a limited amount of information that does not involve a more involved and complex characterization test, but will still allow the users to receive the benefits of enhanced image display. Information regarding the user may be obtained by other indirect methods. Thus, in one embodiment, a user may access an image provider and be identified and tracked over a period of time. During this time, the default image display characteristics applied to images requested by this user may be adjusted for the passage of time and the consequent degradation of the user's display due to age and use (e.g. phosphor degradation). The amount of use of the monitor (e.g. hours per week) may be deduced from user input and/or, in one embodiment, the frequency and length of time the user spends accessing the image providers employing the present invention (e.g. World Wide Web sites).

Figure 21:
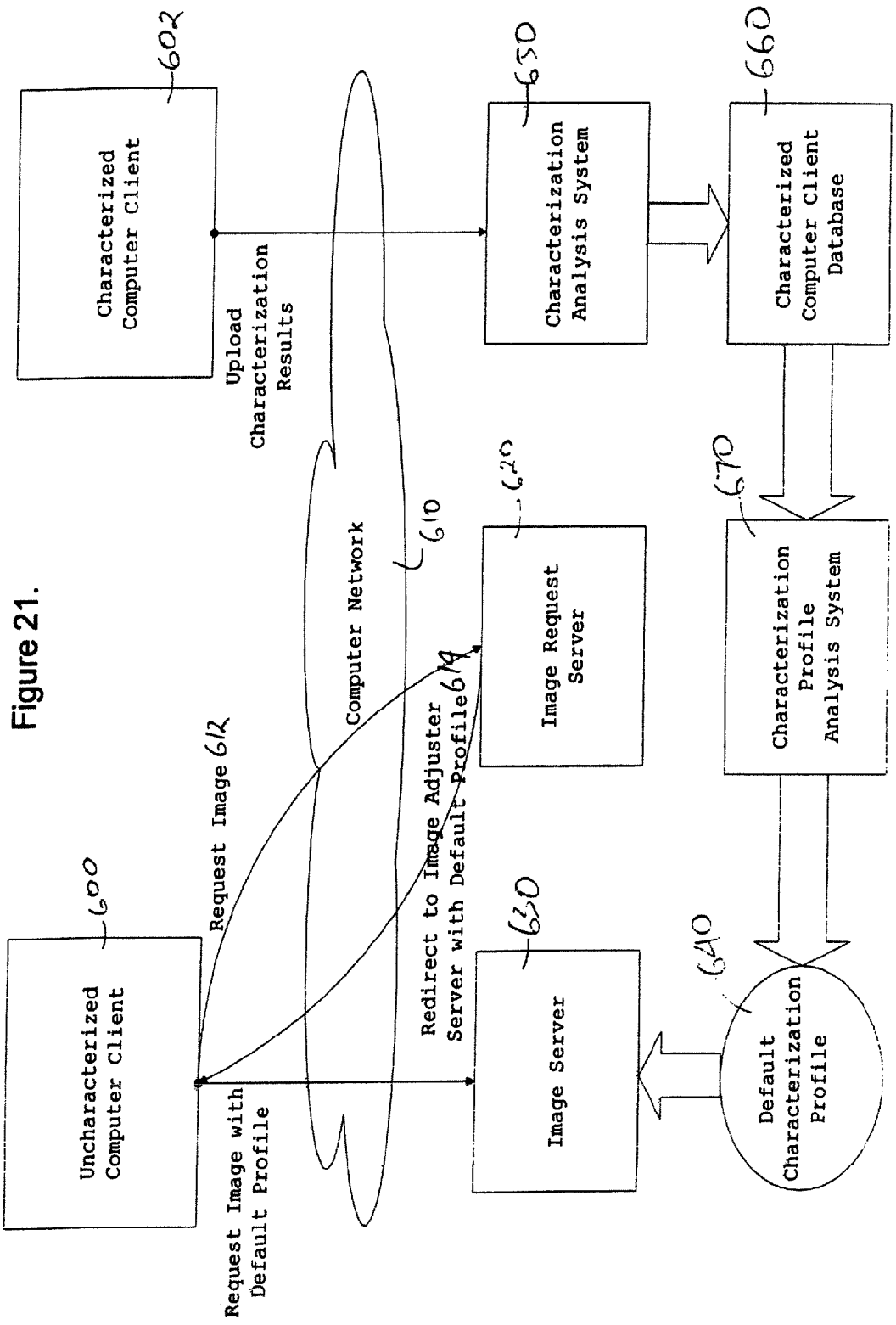
FIG. 21 is a stylized block diagram of an alternate network according to the present invention.

With reference to FIG. 21, in a preferred embodiment of the invention the target display system is a computer monitor used by an uncharacterized computer client 600 accessing a web site via a computer network 610 such as the Internet. An image request server 620 hosting the accessed website would receive an image request 612 and determine the lack of image display characteristics for client 600. The image request server may then redirect the image request 614 to an image server 630 together with information identifying the client as noncharacterized, thus informing the image server to process all images provided to the client according to a default set of characteristics 640. As previously described, the default profile 640 may be derived from a database 660 of characterized users 602.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. An image server to provide images to a client computer over a computer network, comprising
    an image request server to receive a request from the client computer for data including an image;
    a database checker to determine an unavailability of image display characteristics for the client computer;
    a database of image display characteristics to adjust the requested image in accordance with a set of default image display characteristics for display on the client computer, the set of default image display characteristics being unrelated to the image display characteristics of the client; and the image server to adjust the requested image in accordance with the set of default image display characteristics.

2. The server of claim 1, wherein the set of default image display characteristics are based on average image display characteristics of a plurality of computer clients having known image display characteristics.

3. The server of claim 2, further comprising, prior to selecting the set of default image display characteristics:

a statistical system to determine one or more sets of default image display characteristics based on an average image display characteristic of the plurality of computer clients having known image display characteristics.

4. The server of claim 3, wherein the statistical system to determine one or more sets of default image display characteristics comprises:

grouping logic to identify one or more groups of the computer clients having known image display characteristics; and the statistical system to calculate a set of default image display characteristics for each group of computer clients having the known image display characteristics.

5. The server of claim 3, wherein the known image display characteristics are determined by requesting information from a user of the client computer.

6. The server of claim 3, further comprising:

the database of image display characteristics adjusted by removing known image display characteristics associated with a particular computer client when the computer client has been inactive for a period of time.

7. The server of claim 1, wherein the database is organized as a multidimensional parameter space of input and output image display characteristics.

8. The server of claim 7, wherein a multidimensional histogram is computed from the database to specify a fraction of image display characteristics which exhibit a specific set of parameters.

9. The server of claim 1, wherein the set of default image display characteristics is derived to address particular aspects of the client computer.

10. The server of claim 9, wherein the particular aspects of the client computer are obtained directly from an end user of the client computer.

11. The server of claim 10, wherein the particular aspects of the client computer comprise one or more of: a type of a display for the client computer, a size of the display, the age of the display, a environment in which the display is used, a operating system software of the client computer, and a type of hardware controlling the display.

12. The server of claim 9, further comprising the image server tracking the client computer over a period of time and adjusting the display of the images beyond the default image display characteristics for at least one of: a passage of time, a consequent degradation of a display, an amount of use of the display, a frequency which the user spends accessing the images, and a length of time the user spends accessing the images.

13. A method of adjusting an image comprising:

receiving by an image request server, a request for data including the image from a requesting system;

determining by a database checker, that no image display characteristics are available for the requesting system; and adjusting the image in accordance with a set of default image display characteristics for display on the requesting system, the set of default image display characteristics being unrelated to the image display characteristics of the requesting system.

14. The method of claim 13, wherein the set of default image characteristics are determined based on an average image display characteristic of the plurality of computer clients having known image display characteristics.

15. The method of claim 14, wherein the average image characteristic is based on one or more of: type of a display, size of the display, age of the display, a environment in which the display is used, an operating system software, and a type of hardware controlling the display.

16. The method of claim 14, further comprising:

removing an out-of-use known image display characteristic from the database when no requests from computer clients with the out-of-use known image display characteristic have been received for a pre-selected period of time.

17. The method of claim 13, further comprising:

tracking the client computer over a period of time; and adjusting the display of the images beyond the default image display characteristics, based on the tracking, for at least one of: a passage of time, a consequent degradation of a display, an amount of use of the display, a frequency which the user spends accessing the images, and a length of time the user spends accessing the images.

18. A method of adjusting an image comprising:

receiving by an image request server, an image request from an uncharacterized device;

determining by a database checker, that no image display characteristics are available for the uncharacterized device;

adjusting the image in accordance with a set of default image display characteristics, the default image display characteristics based on an average image display characteristic of a plurality of systems having known image display characteristics.

19. The method of claim 18, further comprising:

determining that no requests have been received from a system having a particular known image display characteristic in a period of time; and removing the particular known image display characteristic from the average image display characteristic.

* * * * *